United States Patent

Mori et al.

[11] Patent Number: 5,867,468
[45] Date of Patent: Feb. 2, 1999

[54] OPTICAL PICKUP WITH A VERTICALLY MOVABLE APERTURE MEANS

[75] Inventors: Taiichi Mori, Fukuoka-ken; Masaharu Fukakusa, Saga-ken, both of Japan

[73] Assignee: Matsushita Electric Industrial Co., Ltd., Osaka, Japan

[21] Appl. No.: 815,661

[22] Filed: Mar. 10, 1997

[30] Foreign Application Priority Data

Mar. 11, 1996 [JP] Japan ................................. 8-052783
May 14, 1996 [JP] Japan ................................. 8-118697

[51] Int. Cl.$^6$ .................................................. G11B 7/135
[52] U.S. Cl. .................. 369/112; 369/44.23; 369/44.24; 369/94; 369/103; 369/109; 369/118
[58] Field of Search ........................... 369/94, 103, 118, 369/112, 44.23, 44.37, 109, 44.14, 44.24

[56] References Cited

U.S. PATENT DOCUMENTS

| | | | |
|---|---|---|---|
| 5,625,613 | 4/1997 | Kato et al. | 369/112 |
| 5,629,919 | 5/1997 | Hayashi et al. | 369/112 |
| 5,638,353 | 6/1997 | Takahashi | 369/112 |
| 5,644,563 | 7/1997 | Yang | 369/112 |
| 5,657,305 | 8/1997 | Sasaki et al. | 369/110 |
| 5,684,779 | 11/1997 | Ohuchida et al. | 369/109 |

*Primary Examiner*—Tod R. Swann
*Assistant Examiner*—Kim-Kwok Chu
*Attorney, Agent, or Firm*—Stevens, Davis, Miller & Mosher, L.L.P.

[57] ABSTRACT

An optical pickup includes a light source, a light converging portion for converging a light emitted from the light source on the recording surface of an optical disk, a signal detecting portion for detecting a light reflected by the recording surface and converting this light into a specified electric signal, a first optical element, which is arranged between the light source and the light converging portion for forming a plurality of diffracted lights from the light emitted from the light source, and a second optical element, which is arranged between the light source and the light converging portion and in which an optical path for the light reflected by the recording surface of the optical disk and an optical path for the emitted light are different from each other. Thus, without increasing the weight of a movable portion and also without increasing the manufacturing costs of a condenser lens, reproducing is performed from a high density optical disk and a conventional low density optical disk, which are different in standard.

16 Claims, 16 Drawing Sheets

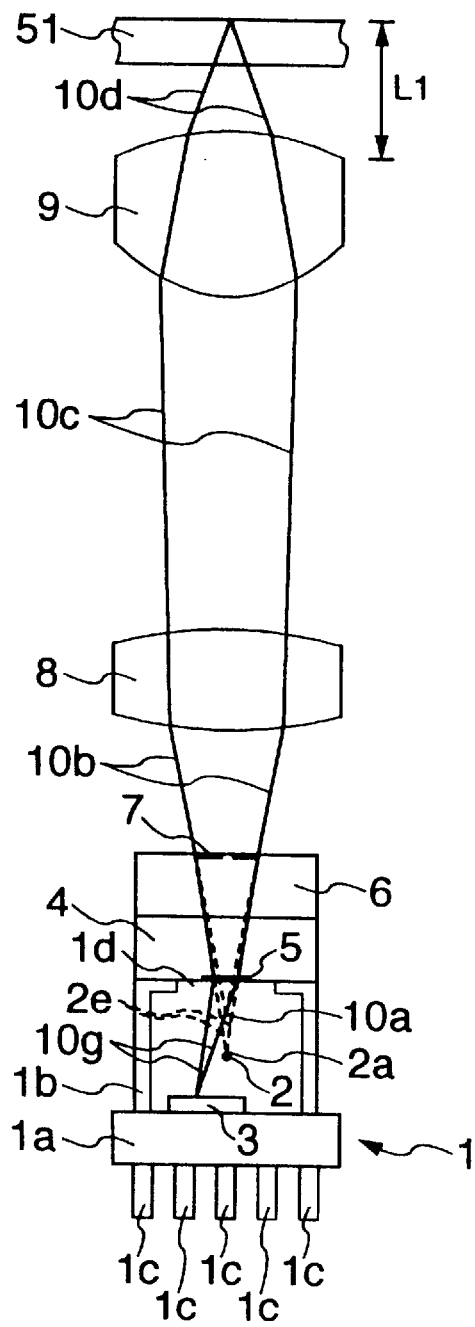
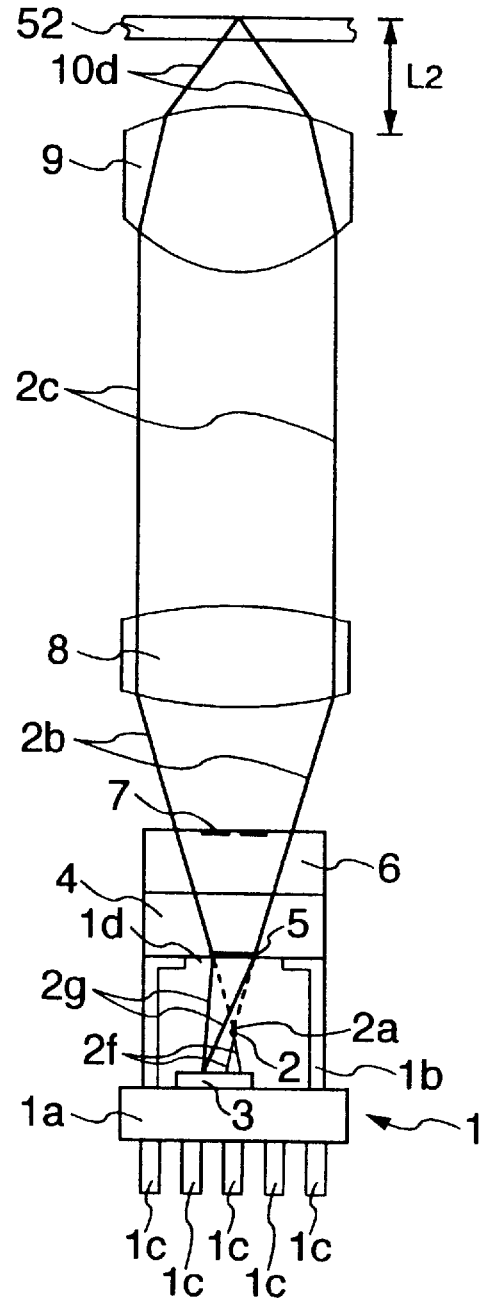

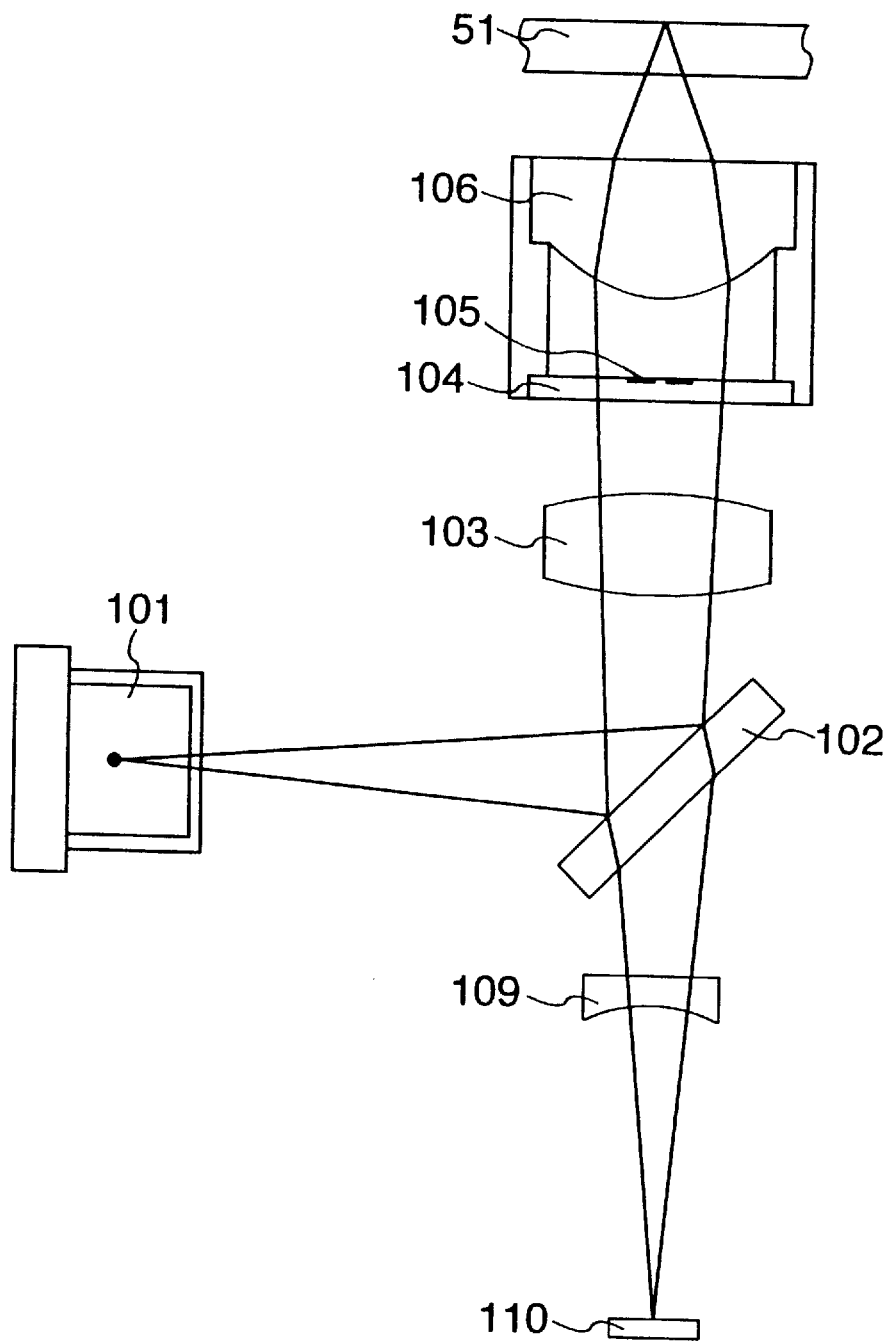

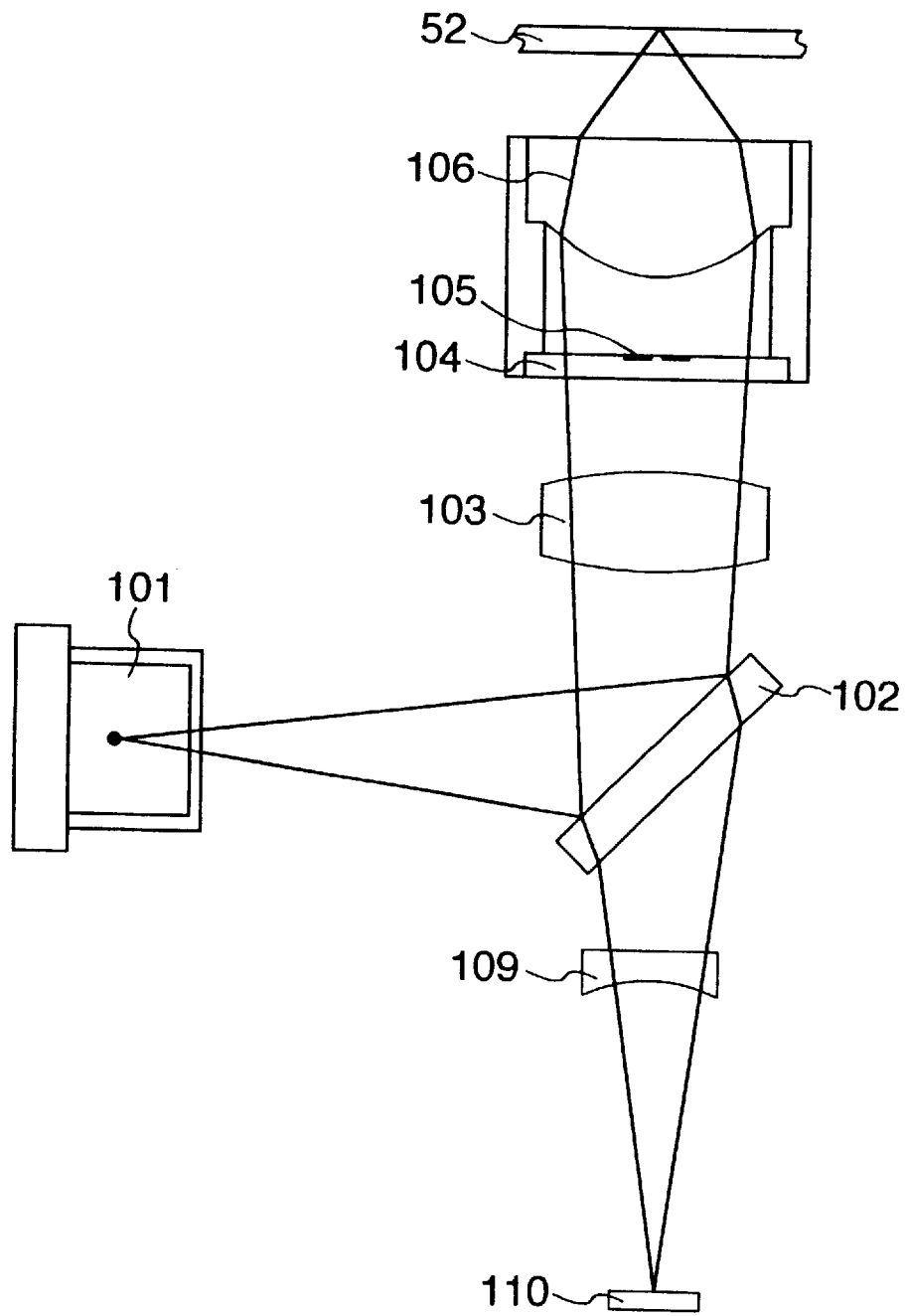

OPTICAL PICKUP WITH A VERTICALLY MOVABLE APERTURE MEANS

BACKGROUND OF THE INVENTION

1. Field of the Invention

The present invention relates to an optical pickup, which enables optical disks having different standards regarding the thickness of a disk substrate, a recording density and so on to be recorded/reproduced as in the cases of a conventional low density optical disk, such as CD, CD-ROM and the like, and a high density optical disk, such as a digital video disk and the like (DVD, DVD-ROM).

2. Description of the Related Art

In order to reproduce information from two kinds of optical disks different in a substrate thickness and a recording density by the same optical system, there has been known a method using a bifocal condenser lens, which is described in pp. 27 to 29, "OPTICAL REVIEW" Vol. 1, No. 1 (1994).

A conventional optical pickup using a bifocal condenser lens will be described by referring to FIGS. 16A and 16B. FIGS. 16A and 16B each illustrates the configuration of an optical pickup, which is capable of performing reproducing from both of a conventional low density optical disk and a high density optical disk by using a bifocal condenser lens, and a light path. In FIG. 16A, reproducing of a conventional low density optical disk is shown. In FIG. 16B, reproducing of a high density optical disk is shown. The configurations of the optical systems are the same in FIGS. 16A and 16B, but light paths are different. A numeral 101 denotes a semiconductor laser, which has a wavelength shorter (636 nm to 650 nm) than the wavelength (780 nm) of a semiconductor laser used for the conventional low density optical disk. A numeral 51 denotes a conventional low density optical disk, which has a substrate thickness of 1.2 mm. A numeral 52 denotes a high density optical disk, which has a substrate thickness of 0.6 mm. In practice, recording/reproducing is performed by mounting any one of these optical disks on a spindle motor (not shown) for rotating a disk. A numeral 104 denotes a transparent substrate in which a concentric circular hologram element 105 is formed around an optical axis, and this transparent substrate is fixed to the same member as a condenser lens 106 and supported so as to be moved in focusing and tracking directions integrally with the condenser lens 106 by lens driving means (not shown). During recording/reproducing of data, in order to always form a very small spot in the recording surface of the optical disk 51 or 52, control is performed in a focusing direction so as to follow the face wobbling of a disk. Also, control is performed in a tracking direction in order that a spot may always follow a data track.

The operation of the foregoing conventional optical pickup will be described. A luminous flux radiated from the semiconductor laser 101 is raised in the direction of the Optical disk 51 or 52 by a half mirror 102, and converted into a parallel luminous flux by a collimator lens 103. The flux converted into the parallel luminous flux by the collimator lens 103 is made incident on the transparent substrate 104. A part of the luminous flux made incident on the transparent substrate 104 is diffracted by the hologram element 105, and the remaining parts are made incident on the condenser lens 106 without being diffracted. The condenser lens 106 is designed to fit the high density optical disk 52 having a disk substrate thickness of 0.6 mm, and thus the luminous flux passed through the transparent substrate 104 and moved straight ahead without being diffracted by the hologram element 105 can form a very small spot on the recording surface of the high density optical disk 52 having a substrate thickness of 0.6 mm. On the other hand, the hologram element 105 is designed in order that a 1st-order diffracted luminous flux may form a very small spot on the recording surface of the conventional low density optical disk 51 having a substrate thickness of 1.2 mm when this is converged by the condenser lens 106, and thus the 1-order luminous flux diffracted by the hologram element 105 can form a very small spot on the recording surface of the conventional low density optical disk having a substrate thickness of 1.2 mm. As described above, in the conventional optical pickup using the bifocal lens, recording/reproducing of the high density optical disk having a disk substrate thickness of 0.6 mm is performed by a luminous flux (0-order diffracted light), which is not diffracted by the hologram element 105. In this case, however, since the spot of a light diffracted by the hologram element 105 is deviated from a focus by a large amount, this is blurred and spread on the recording surface, and thus little influence is given to reproducing from the high density optical disk having a disk substrate thickness of 0.6 mm. Conversely, during reproducing from the conventional low density optical disk having a disk substrate thickness of 1.2 mm, this is performed by a 1st-order diffracted light of the hologram element 105. In this case, since the spot of a non-diffracted transmitted light is also deviated from a focus by a large amount, little influence is given to reproducing. A reflected light from the recording surface of the optical disk 51 or 52 is sent to the half mirror 102 through a path reverse to an outgoing path, converged on a photodetecting element 110 by a concave lens 109 after passing through the half mirror 102, and then a reproducing signal is detected.

FIGS. 17A and 17B each illustrates the configuration of another conventional example. In this example, a hologram element 105 is directly provided on a curved surface opposite a surface which faces the optical disk of a condenser lens 106. The other parts of the configuration and the operation are the same as in the example shown in FIGS. 16A and 16B.

Problems inherent in the foregoing conventional optical pickup are as follows.

The condenser lens 106 and the transparent substrate 104 in which the hologram element 105 is formed are made integral to each other and driven by the lens driving mechanism (not shown). Because of this integral formation of the condenser lens 106 and the transparent substrate 104, a movable part becomes thick and a weight is also increased. Consequently, it is also necessary to increase the size of the lens driving mechanism, and this in turn makes it difficult to miniaturize the optical pickup and reduce its weight.

Even if such an increase in the size of the movable part does not occur, it is difficult to accurately form a hologram element on a curved surface during manufacturing of a metallic mold for the condenser lens. Also, because of the existence of the hologram element, the number of lenses which can be formed by one metallic mold is smaller than a conventionally possible number, and thus manufacturing costs are increased.

Furthermore, during reproducing from the conventional low density optical disk 51, a 1st-order diffracted light diffracted by the hologram element 105 is used. During reproducing from the high density optical disk 52, a 0-order light not diffracted by the hologram element 105 is used. In practice, however, 1st-order or higher order diffracted lights are also produced. The existence of these lights which are not used reduces light utilization efficiency, and thus it is difficult to reduce the output of the semiconductor laser.

SUMMARY OF THE INVENTION

The present invention was made in order to solve the problems such as the increase in the size and weight of the movable part including the condenser lens, the increase in the manufacturing costs of the condenser lens, and the like, which occur due to the formation of the hologram element for focusing in a plurality of spots. It is an object of the present invention to provide an optical pickup, which is capable of performing reproducing from a high density optical disk and a conventional low density optical disk by using a general condenser lens designed for a high density optical disk.

The purpose of the present invention is achieved by an optical pickup, which includes converging means for converging a light emitted from a light source on the recording surface of an optical disk, signal detecting means for detecting a light reflected on the recording surface and converting this into a specified electric signal, a first optical element arranged between the light source and the converging means for forming a plurality of diffracted lights from the light emitted from the light source, and a second optical element arranged between the light source and the converging means for causing an optical path for a light reflected on the recording surface of the optical disk and an optical path for a reflected light to be different from each other.

According to this constitution, it is not necessary to make integral a condenser lens and an optical member in which a hologram element is formed or to form a hologram element in a condenser lens. Thus, the problems of an increase in the size and weight of a movable part, an increase in the manufacturing costs of the condenser lens and so on can be solved. Consequently, by using a general condenser lens designed for a high density optical disk, it is possible to perform reproducing from a high density disk and a conventional low density optical disk, which are different in standard.

Another object of the present invention is to provide an optical pickup, which is capable of performing reproducing from a high density disk and a conventional low density optical disk by moving an aperture member having an opening part to be moved in the direction of an optical axis so as to change a light passing region and changing a focus forming position.

Furthermore, a passing region is changed for a light guided from a light source by moving the aperture member having the opening part to be moved in the direction of the optical axis, and thereby a spot diameter of the light converged on the recorded surface is changed.

According to this constitution, a diameter of a light made incident on the condenser lens can be set to a specified size, and a focus forming position of a light converged on the optical disk can be controlled. Consequently, it is possible to simplify the structure of an optical pickup, which is capable of performing recording/reproducing for plural kinds of optical disks having different recording surface positions. Also, it is possible to provide a good responding speed by using an electromagnetic force as a moving method.

BRIEF DESCRIPTION OF THE DRAWINGS

FIGS. 2A and 2B are views, each showing a constitution of the optical pickup and a returning path according to the first embodiment of the invention.

FIGS. 16A and 16B are views, each showing a constitution of a conventional optical pickup and an optical path.

DESCRIPTION OF THE PREFERRED EMBODIMENTS (Embodiment 1)

Figure 1A:
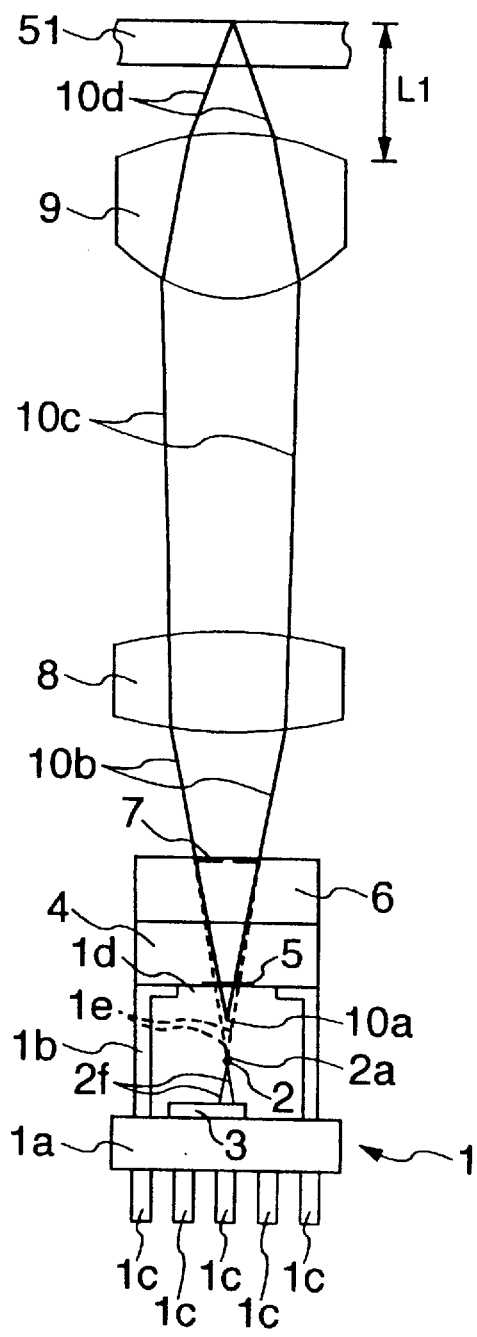
FIGS. 1A and 1B are views, each showing a constitution of an optical pickup and an outgoing path according to a first embodiment of the present invention.
Figure 1B:
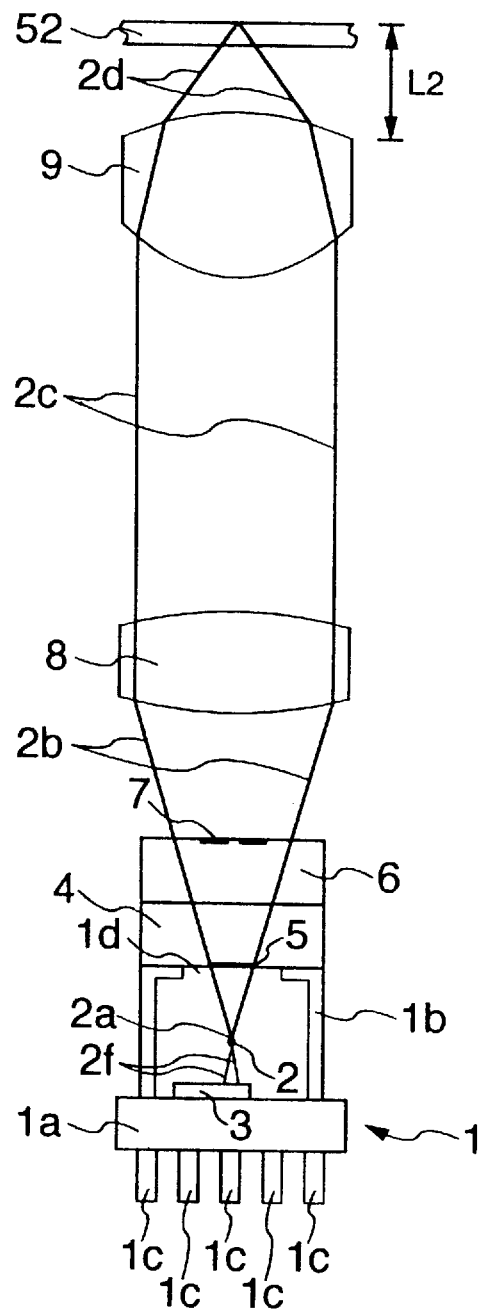

FIGS. 1A and 1B are views, each showing the constitution of an optical pickup and a path from a light emitting point to a light converging point on the recording surface of a disk, that is, an outgoing path, in the first embodiment of the present invention. FIGS. 1A and 1B show the same constitution. But FIG. 1A shows an optical path when reproducing is performed from a conventional low density optical disk while FIG. 1B shows an optical path when reproducing is performed from a high density optical disk. In FIGS. 1A and 1B, a numeral 1 denotes a light source package, which is composed of a substrate part 1a for mounting a light source 2, a light receiving element 3 and so on, a side wall portion 1b provided so as to include these members, and the like. The substrate portion 1a, side wall portion 1b and so on may be formed integrally or separately. In the case of the integral formation of these, an assembling process can be simplified, and this makes it possible to reduce manufacturing costs. On the substrate portion 1a, there is provided a terminal 1c for supplying power to the light source 2 and transmitting an electric signal from the light receiving element 3 to an arithmetic and logic unit (not shown). This terminal 1c may be a pin type or a print type.

For the light source 2, various lasers including a semiconductor laser, a gas laser of He-Ne and the like may be considered. Herein, it is preferred to use a semiconductor laser, which is the smallest of these enabling an entire device to be miniaturized, has an inexpensive unit price and an output of about several mW to several tens mW. It is also preferred to use a semiconductor laser which has an oscillation wavelength of 680 nm or lower, in particular 650 nm or lower, because the spot diameter of a beam can be made smaller.

A first optical member 4 is joined to the emitting portion 1*d* of the light source package 1. This first optical member 4 has a light guiding element 5 for guiding an optical path for a light reflected from a recording medium to the specified position of the light receiving element 3. This first optical member 4 is preferably formed to be a parallel and flat plate, because this can prevent the occurrence of aberration and the like. For its attaching position, preferably the member 4 is accurately attached so as to be almost perpendicular to the optical axis of a passing light, because this can prevent the occurrence of astigmatism. A second optical member 6 is joined to an end surface portion in a side, which is opposite the light source package 1 of the first optical member 4. The form and attaching method of the second optical member 6 are the same as those for the first optical member 4. This second optical member 6 has a plural optical path forming element 7, which functions to form at least two focuses.

Herein, the light guiding element 5 is preferably arranged closer to the light source 2 than to the plural optical path forming element 7. Because of this structure, it is possible to prevent an optical signal from being deteriorated due to reflection or diffraction, which occurs hen a light from the light guiding element 5 to the light receiving element 3 is passed through the plural optical path forming element 7. As a result, an optical pickup having a good C/N ratio can be provided.

In the first embodiment, the first and second optical members 4 and 6 are provided separately. However, as described later by referring to a second embodiment, it is preferred to integrally form the first and second optical members 4 and 6 of the same materials and plural optical path forming elements 7 and light guiding element 5 respectively in the front and back portions of these members. Because of this structure, it is possible to reduce costs by reducing the number of parts and to prevent an optical characteristic from being deteriorated due to the occurrence of an attaching positional shift between the first and second optical members 4 and 6. Consequently, the reliability of the optical pickup can be improved.

The plural optical path forming element 7 and the light guiding element 5 were both formed of holograms. However, an optical member, for instance a lens, may be used as long as this serves the same function.

The inside of the light source package 1, that is, a space in which the light source 2, the light receiving element 3 and the like are arranged, is preferably sealed hermetically by the light source package 1 and the first optical member 4. Because of this structure, it is possible to prevent dust and water from entering the inside of the package. Consequently, performance of each of the light source 2 and the light receiving element 3 can be maintained, and an optical characteristic of an emitted light can be prevented from being deteriorated. Furthermore, it is preferred to inject inert gas such as N2 gas, dry air, Ar-gas or the like into the space sealed by the light source package 1 and the first optical member 4 beforehand. In this manner, it is possible to prevent an optical characteristic from being deteriorated due to dew condensed on the surface of the member formed of a glass material, such as the first optical member 4 and the like.

A numeral 8 denotes a collimator lens, and a numeral 9 denotes a condenser lens, which is supported so as to be moved in focusing and tracking directions by lens driving means (not shown). Since the quantity of a light made incident on the condenser lens 9 can be increased by this collimator lens 8, it is possible to improve light utilization efficiency and use a light source having a small output. Therefore, an economical optical pickup which consumes less power can be provided.

Instead of the collimator lens 8, for instance, a function for converting a light diffusion angle may be provided in the light guiding element and so on. In this case, since it is not necessary to provide the collimator lens 8, accurate positioning becomes unnecessary, and the reduced number of parts makes it possible to reduce costs.

Next, the operation of the optical pickup having the foregoing constitution will be described with reference to the accompanying drawings.

First, the operation when reproducing is performed from a high density optical disk will be described by referring to FIG. 1B. A numeral 52 denotes a high density optical disk, which is mounted on a spindle motor (not shown) and composed by sticking a disk substrate having a thickness of 0.6 mm. A luminous flux 2*b* emitted from the light emitting point 2*a* of the light source 2 is passed through the optical members 4 and 6 and made incident on the collimator lens 8. A luminous flux 2*c* from the collimator lens 8 is converged like a luminous flux 2*d* by the condenser lens 9 and then converged on the recording surface of the high density optical disk 52. The condenser lens 9 is designed to have a numerical aperture of about 0.6 so as to perform diagramming to a very small spot, which enables data to be reproduced from a high density disk. Herein, although parts of a light are diffracted when passing through the light guiding element 5 and the plural optical path forming element 7, only a part of the light passed without being diffracted (0-order diffracted light in the case of the first embodiment) is converged on the recording surface of the high density optical disk in this case. Among the parts of the light which have been diffracted, some are made incident on the condenser lens 9. However, since these are blurred and spread on the recording surface of the high density optical disk 52, these parts give little influence to data reproduction.

A numeral 2*f* denotes a light emitted from a side reverse to the light emitting point 2*a* of the light source 2. The emitted light 2*f* is made incident on a monitoring sensor provided in the light receiving element 3. The light source 2 is controlled based on an electric signal from the monitoring sensor so as to make the quantity of an emitted light constant.

Next, the operation when reproduction is performed from a conventional low density optical disk 51 will be described by referring to FIG. 1A. The conventional low density optical disk 51 has a thickness of about 1.2 mm. A light, 2*e* emitted from the light emitting point 2*a* of the light source 2 is passed through the optical members 4 and 6 and made incident on the plural optical path forming element 7. The plural optical path forming element 7 causes the incident light to be diffracted to be 0-order, ±1st-order, ±2nd-order lights and so on. The external shape of the plural optical path forming element 7 has a concentric circular irregular pattern around an optical axis. In this manner, a+1st-order diffracted light appears to have been converted into a luminous flux 10*b* emitted from the emitting point 10*a*. The luminous flux 10*b* diffracted by the plural optical path forming element 7 is converted into a luminous flux 10*c* by the collimator lens 8 and converged like a luminous flux 10d on the recording surface of the conventional low density optical disk 51 by the condenser lens 9. During the period of performing reproducing from the conventional low density optical disk 51, a focal length L1 of the condenser lens 9 is set longer than a focal length L2 of the condenser lens 9 during reproducing from the high density optical disk 52. It is preferred to set this focal length difference to 1.0 mm or lower, in particular 0.6 mm or lower. This is because in this manner a focal position can be easily adjusted by an actuator for holding the condenser lens 9, and thus it is possible to greatly improve management of a difference in substrate thickness.

Since two or more focuses are formed in different positions by the plural optical path forming element 7 as described above, reproducing can be performed from recording media different from each other in substrate thickness by the same optical pickup. That is, recording/reproducing can be performed from an optical disk like CD-ROM having a thickness of 1.2 mm and a high density optical disk like DVD having a thickness of 0.6 mm by the same optical pickup.

The focal lengths L1 and L2 can be changed to a certain extent by increasing the moving range of the optical member like the condenser lens. Thus, reproducing can also be performed for an optical disk to which, for instance a high density disk is stuck, or an optical disk which has a plurality of recording layers.

Next, an optical path up to detection of reflected lights from the conventional low density optical disk 51 and the high density optical disk 52, that is, a returning path, will be described by referring to FIGS. 2A and 2B. FIGS. 2A and 2B each illustrates the configuration of the optical pickup and a returning path in the first embodiment of the present invention.

First, reproducing from the high density optical disk 52 will be described by referring to FIG. 2B. A reflected light from the high density optical disk 51 is passed along an optical path, which is almost similar to an outgoing path, and through the optical member 6, and then made incident on the light guiding element 5 formed in the optical member 4. Since the light guiding element 5 is formed in order that a+1st-order light diffracted herein may be converged by the light receiving element 3, a signal is detected according to data regarding the light converged by the light receiving element 3 like a luminous flux 2g and recorded in the high density optical disk 52.

Next, reproducing from the conventional low density optical disk 51 will be described by referring to FIG. 2A. A reflected light from the optical disk 51 is passed along an optical path, which is almost similar to an outgoing path, and then made incident on the plural optical path forming element 7 formed in the optical member 6. A part the light made incident on the plural optical path forming element 7 is converted into a+1st-order light 2e by diffraction so as to be converged almost in the light emitting pint 2a, and then made incident on the light guiding element 5 which is formed in the optical member 4. A hologram pattern is formed in the light guiding element 5 such that a diffracted+ 1st-order light is converged in the light receiving element 3, and a signal is detected according to data regarding the light converged in the light receiving element 3 like a luminous flux 10g.

Figure 3A:
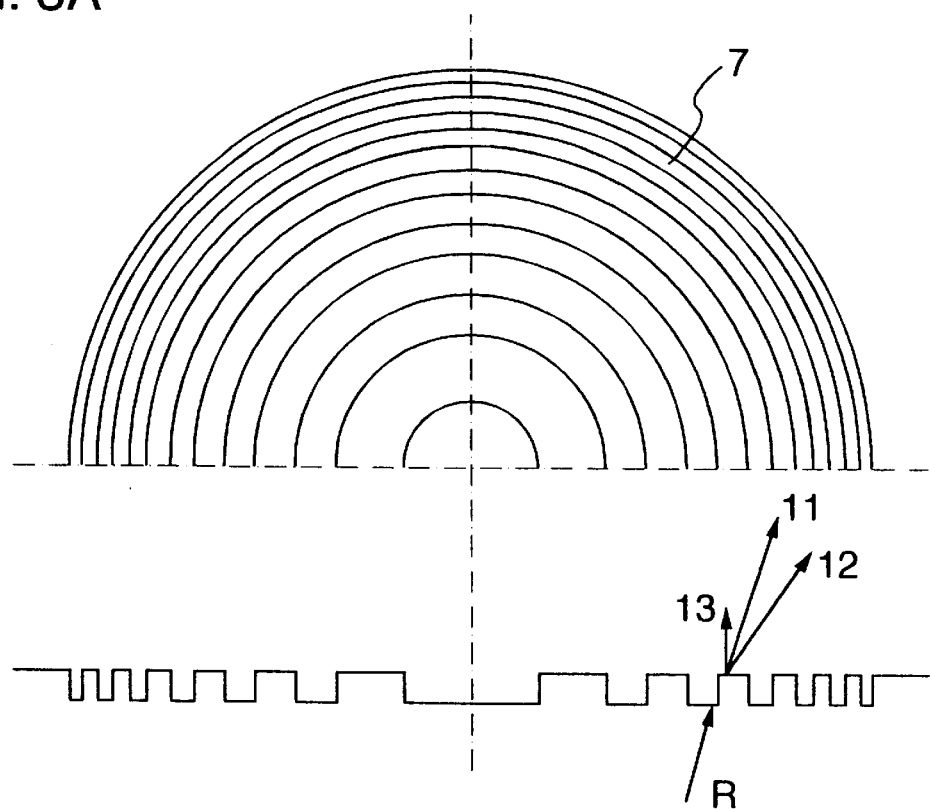
FIGS. 3A and 3B are views, each showing a plurality of optical path forming elements according to the first embodiment of the invention.
Figure 3B:
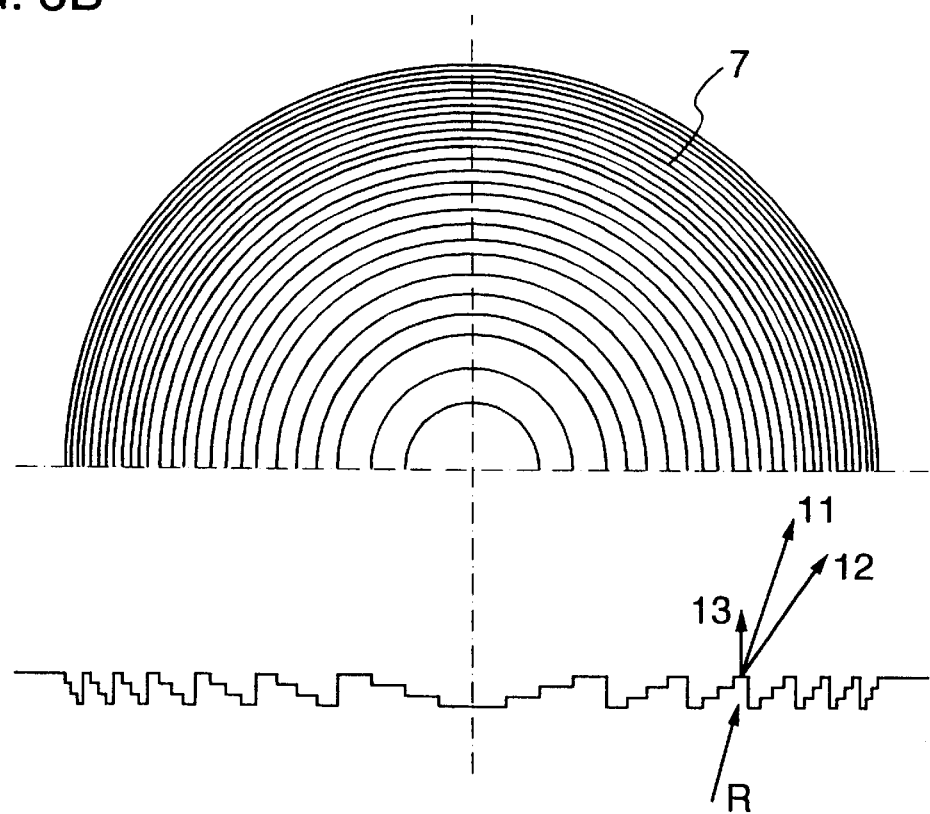

Next, the plural optical path forming element formed in the second optical member 6 will be described by referring to FIGS. 3A and 3B. FIGS. 3A and 3B each illustrates the plural optical path forming element in the first embodiment of the present invention.

The plural optical path forming element 7 is concentric circular and irregular in its section, and a pattern is formed to have pitches smaller toward the peripheral part. Forming of the pattern is performed by dry etching and so on. When a light R is made incident on a hologram pattern, a 0-order light 11 passed without being diffracted, a diffracted light according to a pitch (+1st-order light 12 or −1st-order light 13) and so on are produced. In the embodiment, the 0-order light 11 is used when reproducing is performed from the high density optical disk 52, and the +1st-order light 12 is used when reproducing is performed from the conventional low density optical disk 52. The −1st-order light 13 is a light, which is not used for any of the disks in the embodiment. A part of the −1st-order light 13 is converged by the condenser lens 9. However, this is greatly blurred and spread on the recording surface of the low density optical disk 51 or the high density optical disk 52, and thus little influence is given to reproducing.

FIGS. 3A shows a rectangular pattern section, and in this case, almost the same quantities of +1st-order and −1st-order lights 12 and 13 are produced. In order to control this −1st-order light 13 and increase the L 1st-order light 12, as shown in FIG. 3B, the section may be formed to have multi-stages aligned in a diffraction direction by preparing a plurality of mask patterns and repeating resist exposing and dry etching. The formation of a pattern like that shown in FIG. 3B can further reduce the influence of the −1st-order light 13 to reproducing, and also since a light quantity necessary for signal detection can be provided, it is possible to use the light source at a low output.

Because of the formation of the plural optical path forming element 7 thus constructed in the second optical member 6, which is positioned between the light source 2 and the collimator lens 8, a plurality of optical paths can be formed before a light emitted from the light source 2 finishes its spreading. Consequently, compared with the formation of the plural optical path forming element 7 in the condenser lens 9, the size of the plural optical path forming element 7 can be made smaller. That is, since a region for forming a hologram can be made smaller, it is possible to improve the productivity of the plural optical path forming element 7.

Furthermore, because of the formation of the plural optical path forming element 7 in the second optical member 6 which is a parallel and flat plate, it is much easier to manufacture this compared with its formation in the condenser lens 9 which is most often aspherical. Consequently, a non-defective production rate can be improved, and thereby manufacturing costs for such an optical pickup can be reduced.

Figure 4:
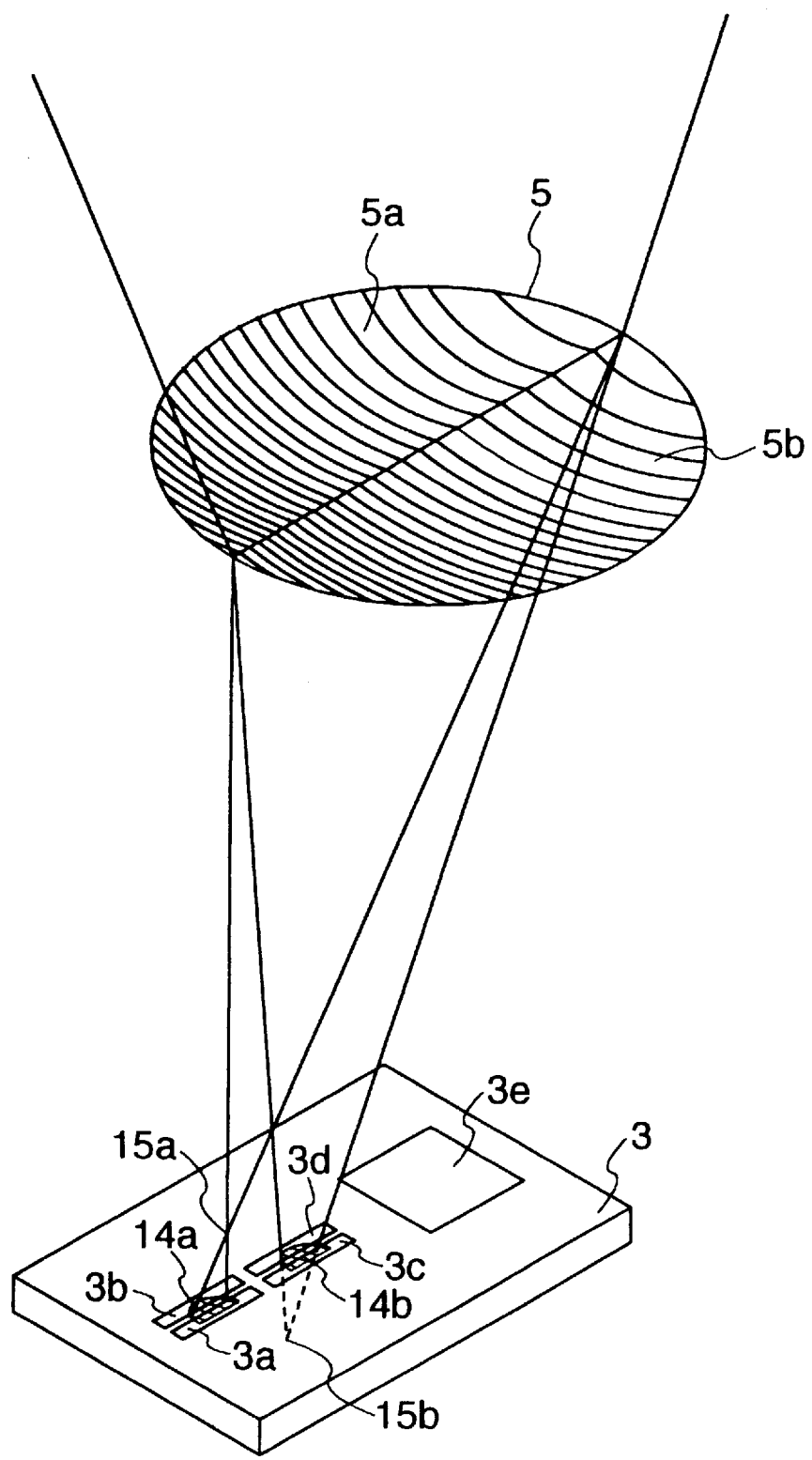
FIG. 4 is a perspective view illustrating a signal detecting method of the optical pickup according to the first embodiment of the invention.

Next, a signal detecting method will be described by referring to FIG. 4. FIG. 4 illustrates in perspective the signal detecting method of the optical pickup in the first embodiment of the present invention.

In FIG. 4, hologram patterns 5a and 5b are formed by bisecting the light guiding element 5 and by means of the same method as that used for the foregoing plural optical path forming element 7. The foregoing monitoring sensor 3e, split sensors 3a and 3b and split sensors 3c and 3d are respectively arranged in the light receiving element 3, which is provided in the light source package 1. Among lights reflected and made incident on the light guiding element 5 according to data on the recording surface of the optical disk, +1st-order lights made incident on the hologram pattern 5a and diffracted form almost semicircular light receiving spots 14a in the split sensors 3a and 3b, and +1st-order lights made incident on the hologram pattern 5b and diffracted form almost semicircular light receiving spots 14b in the split sensors 3c and 3d. Herein, the hologram pattern 5a is formed in order that a +1st-order light may be converged in a point 15a before the sensor surface, and the hologram pattern 5b is formed in order that a +1st-order light may be converged in a point 15b after the sensor surface. A data signal is detected by the sum of the split sensors 3a and 3b and the split sensors 3c and 3d.

In the optical disk device, a very small spot is always formed on the recording surface of the optical disk during recording or reproducing. Thus, it is necessary to perform, by following the face wobbling of the optical disk, focus-control for moving the condenser lens in a focusing direction and tracking control for moving the condenser lens in a tracking direction so as to cause a very small spot to follow a data track. First, a focus error signal detecting method for performing focus control will be described by referring to FIGS. 5A, 5B and 5C. Each of the drawings shows the focus error signal detecting method of the optical pickup in the first embodiment of the present invention.

Figure 5A:
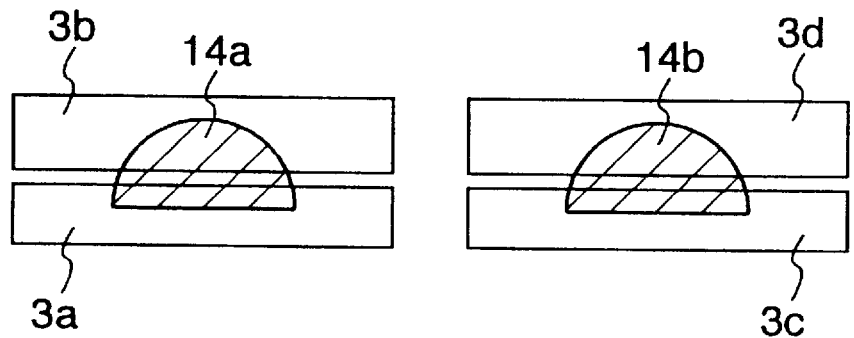
FIGS. 5A to 5C are illustrations of a focus error signal detecting method of the optical pickup according to the first embodiment of the invention.
Figure 5B:
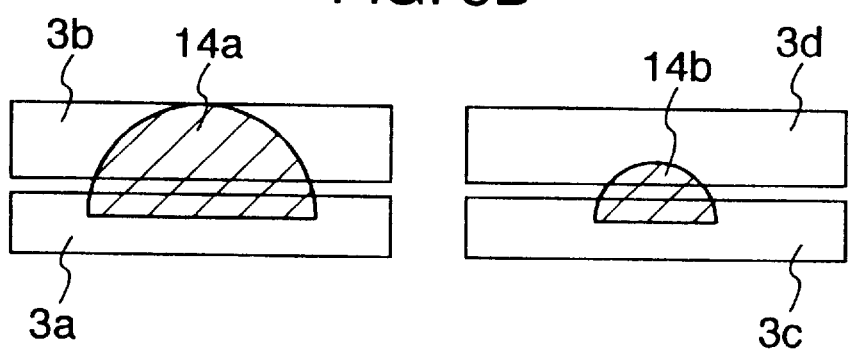
Figure 5C:
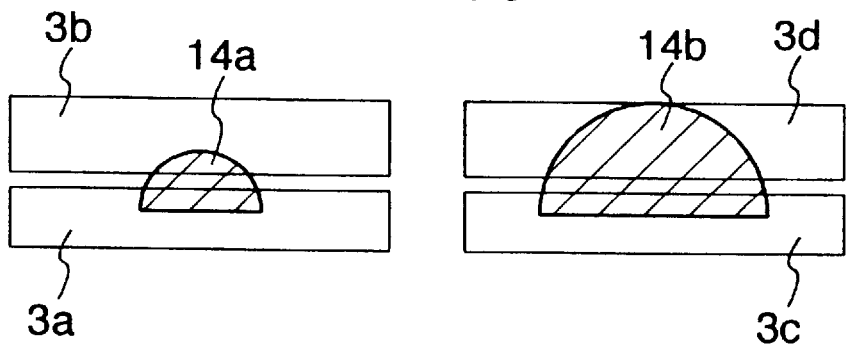

A focus error signal is obtained by detecting a difference between the sum signal of the split sensors 3a and 3c and the sum signal of the split sensors 3b and 3d. FIG. 5A shows an in-focus condition, in which the spots sizes of the light receiving spots 14a and 14b are almost equal to each other. At this time, split sensor division is decided in order that a difference between the sum signal of the split sensors 3 and 3c and the sum signal of the split sensors 3b and 3d may become zero. FIG. 5B shows shifting of the optical disk in a focusing direction, in which the light receiving spot 14a is larger than that in the in-focus condition shown in FIG. 5A, and conversely the light receiving spot 14b is smaller. FIG. 5C shows shifting of the optical disk in a direction reverse to that shown in FIG. 5B, in which the light receiving spot 14a is smaller than that in the in-focus condition of FIG. 5A, and conversely the light receiving spot 14b is larger. Thus, by detecting a difference between the sum signal of the split sensors 3a and 3c and the sum signal of the split sensors 3b and 3d, a focus error signal according to a focus shifting amount is obtained, and by controlling the condenser lens such that a focus error signal can become zero, a very small spot is always formed on the recording surface of the optical disk.

Figure 6A:
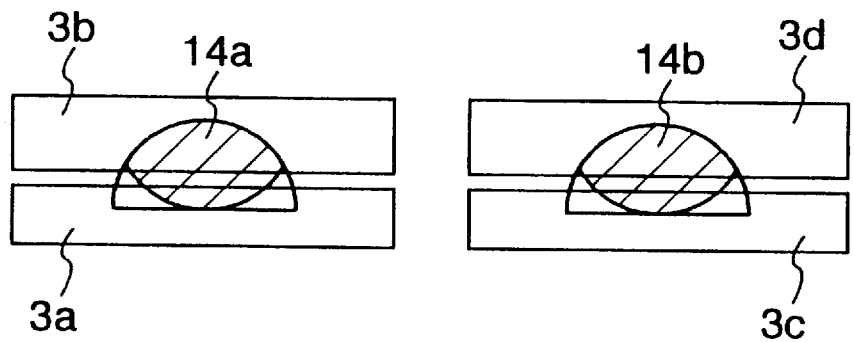
FIGS. 6A to 6C are illustrations of a tracking error signal detecting method of the optical pickup according to the first embodiment of the invention.
Figure 6B:
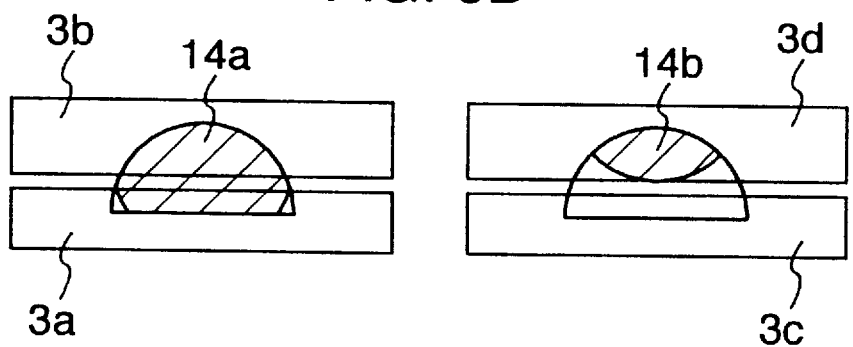
Figure 6C:
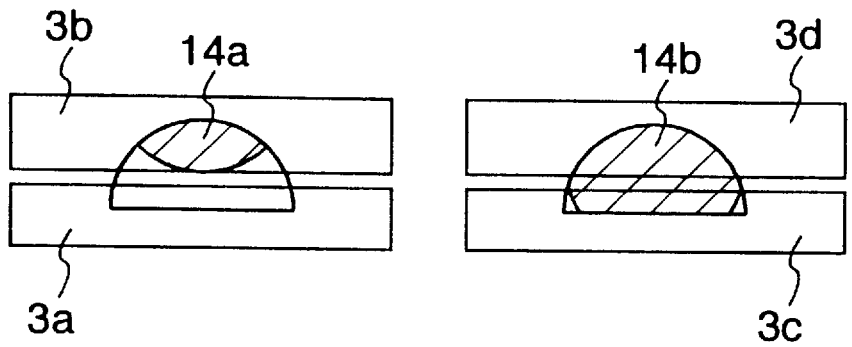

Next, a tracking error detecting method for performing tracking control will be described by referring to FIGS. 6A, 6B and 6C. Each of the drawings shows the tracking error signal detecting method of the optical pickup in the first embodiment of the present invention.

A tracking error signal for performing tracking control is detected by using a generally known push-pull method. FIG. 6A shows the on-track condition of a very small spot on the data track, in which the light quantity of the light receiving spot 14a is equal to that of the light receiving spot 14b. FIG. 6B shows the off-track condition of a very small spot, in which the light quantity of the light receiving spot 14a is larger than that of the light receiving spot 14b. FIG. 6C shows an off-track condition in a direction reverse to that of FIG. 6B, in which the light quantity of the light receiving spot 14a is smaller than that of the light receiving spot 14b. Thus, tracking error signal detection is performed by detecting a difference between the sum signal of the split sensors 3a and 3b and the sum signal of the split sensors 3c and 3d.

To sum up, in the first embodiment of the present invention, by providing the plural optical path forming element 7 between the light source 2 and the condenser lens 8, it is possible to form a compact and simply structured optical pickup, which is capable of reproducing, in a favored manner, different kinds of optical disks, in particular those disks having different distances to the recording surface. Also, because of this constitution, the weights and volumes of movable parts of converting means and so on can be reduced.

Specifically, even when recording/reproducing is performed for optical disks, for instance the conventional low density optical disk and the high density optical disk, which are different in standard about disk substrate thickness, a recording density and so on, since it is not necessary to form a focus forming element in the condenser lens, the condenser lens can be miniaturized and reduced in its weight, and the optical pickup can also be miniaturized and made thin. As a result, manufacturing costs can be reduced.

(Embodiment 2)

The second embodiment of the present invention will be described by referring to FIGS. 7A and 7B.

Figure 7A:
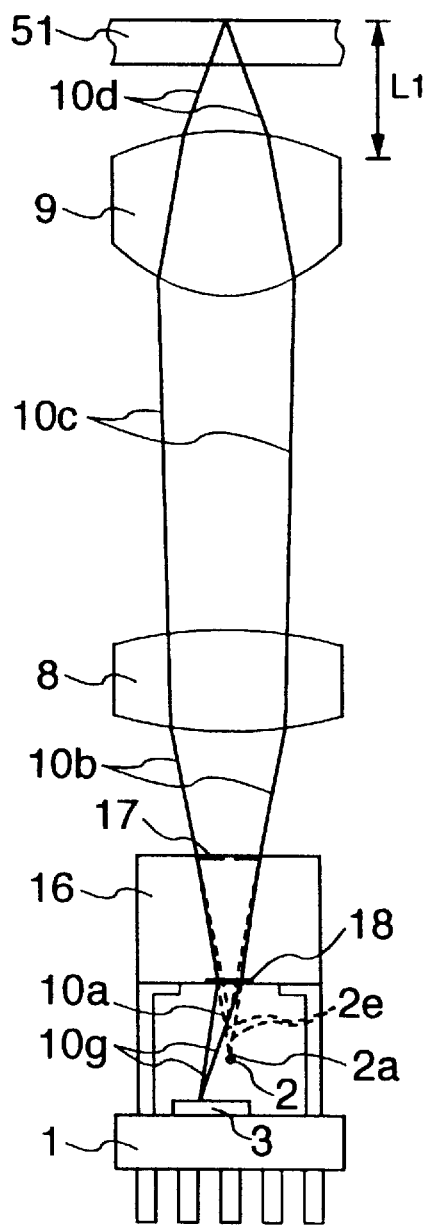
FIGS. 7A and 7B are views, each showing a constitutions of an optical pickup and an optical path according to a second embodiment of the present invention.
Figure 7B:
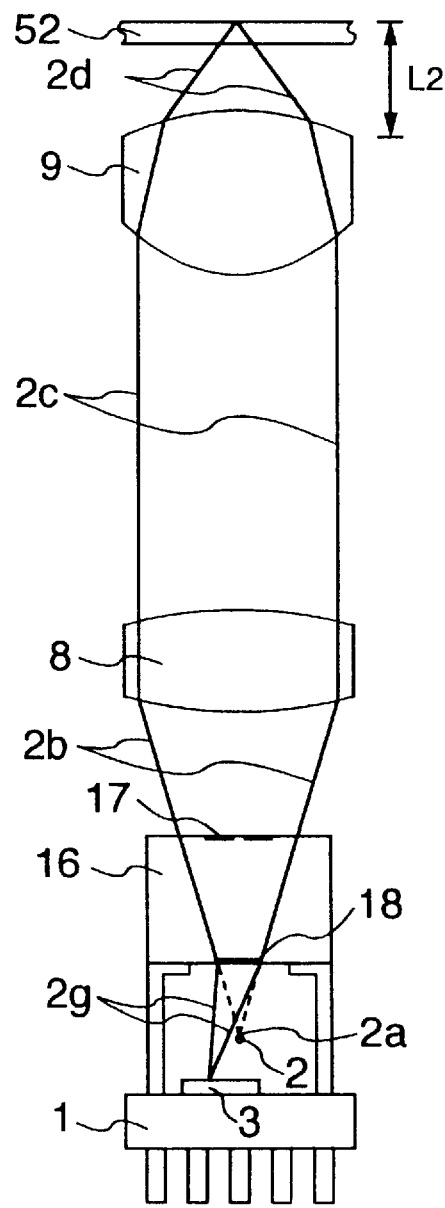

FIGS. 7A and 7B each illustrates the constitution of an optical pickup and an optical path. Specifically, FIG. 7A shows the case of the conventional low density optical disk, and FIG. 7B shows the case of reproducing from the high density optical disk 52. A difference from the first embodiment is that the first and second optical members 4 and 6, which were separately provided in the first embodiment, are integrated into an optical member 16, and a plural optical path forming element 17 and a light guiding element 18 are formed in both of its surfaces. The light guiding element 18 and the plural optical path forming element 17 have the same patterns as those of the light guiding element 5 formed in the first optical member 4 and the plural optical path forming element 7 formed in the second optical member 6 described by referring to the first embodiment, and these function in the same manner as these elements in the first embodiment. This constitution makes it possible to reduce the number of parts and prevent an optical characteristic from being deteriorated due to positional shifting of both members, which is likely to occur during joining between the first and second optical members 4 and 6.

(Embodiment 3)

The third embodiment of the present invention will be described by referring to FIG. 8. The same reference codes will be given to members similar to those shown in the first and second embodiments, and explanation of these will be omitted.

Figure 8:
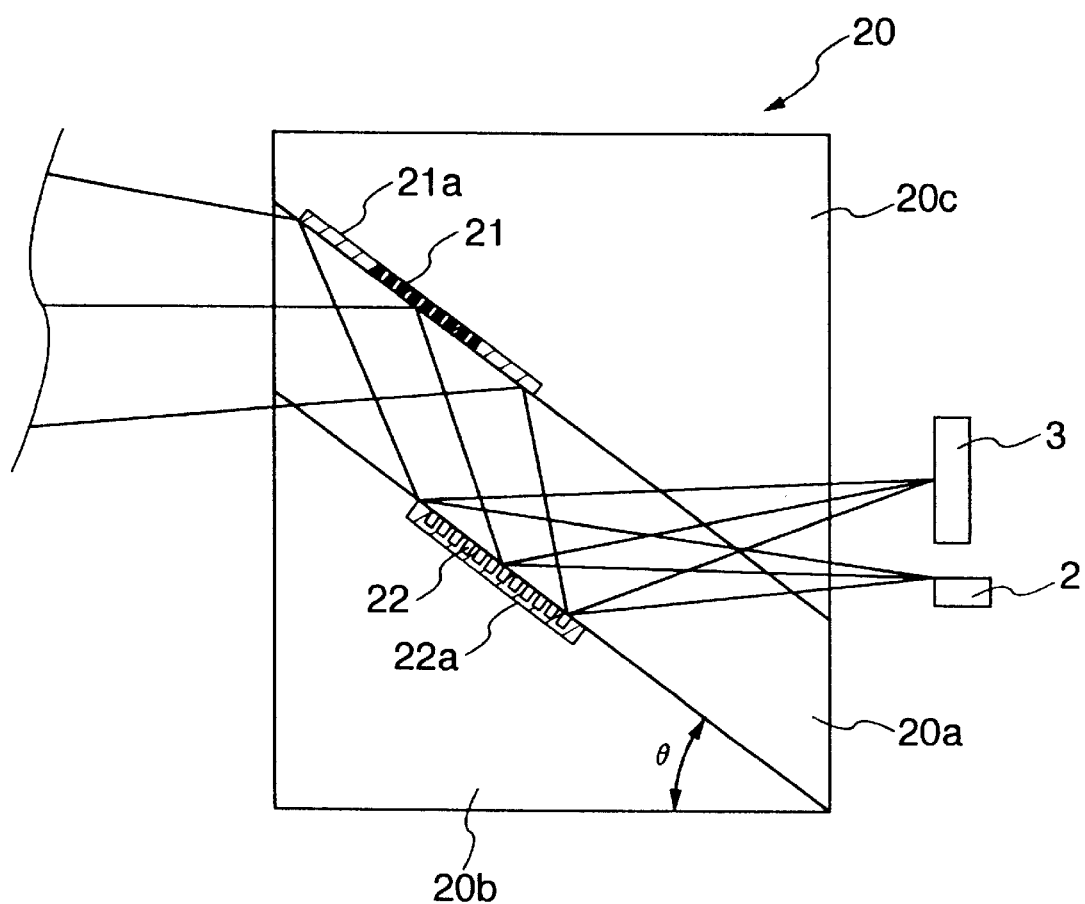
FIG. 8 is a sectional view of an optical member according to a third embodiment of the present invention.

In FIG. 8, the light source 2 and the light receiving element 3 are most often arranged inside the light source package (not shown). A numeral 20 denotes an optical member in which a plural optical path forming element 21 and a light guiding element 22 are formed, and arranged between the light source 2 and the condenser lens 9. As its arranging position, this should preferably be arranged on the light emitting surface of the light source package. This is because such an arrangement makes it possible to accurately position this with respect to the light source 2 and the light receiving element 3 and accurately guide a light to the recording surface of the optical disk and a reflected light to the light receiving element 3.

The plural optical path forming element 21 and the light guiding element 22 are specifically formed in an optical member 20a, which has a slope forming a specified angle θ with an optical axis, and these respectively have reflection films 21a and 22a, each of which is made of a material having a high reflection factor, such as Au, Ag and Al.

Next, a method of manufacturing the optical member 20 will be described in brief. The optical member 20 has a plurality of constitutional members, each of which is made of a material having a high light transmission factor, such as glass. Among the plurality of constitutional members, the plural optical path forming element 21 and the light guiding element 22 are formed in specified positions on the front and back surfaces of the flat plate 20a having a specified thickness. As a method of forming these, dry etching using ion beams is often utilized.

Then, a plurality of these elements are formed at constant intervals on the flat plate, and the reflection films 21a and 22a each having a specified thickness are formed thereon. Then, the flat plate 20a having the plural optical path forming element 21 and the light guiding element 22 formed therein is held between parallel flat plates 20b and 20c, thereby forming a laminated layer, and after joining of these plates, an optical member substrate is formed. Since the flat plate 20a is held between the parallel flat plates 20b and 20c, it is possible to prevent damaging of the plural optical path forming element 21 and the light guiding element 22, which are formed on the surface of the flat plate 20a, and an optical characteristic from being deteriorated due to dust, which is stuck to the surfaces of these elements.

Thereafter, by cutting the optical member substrate based on specified positional relations, a plurality of optical members 20 are obtained. At this time, in order that the surface of the flat plate 20a in which the plural optical path forming element 21 and the light guiding element 22 have been formed and the optical axis of an incident light may form an angle θ, these are cut to be rectangular parallelepiped shapes and formed by polishing at least the surfaces through which a light is passed. The angle θ should preferably be selected such that a dimension of the optical member 20 can be small.

The plural optical path forming element 21 is a reflective type hologram element and formed to be an almost elliptic irregular pattern. Also, the light guiding element 22 is a reflective type hologram element, which is designed to diffract a returning reflected light from the optical disk and guide this to the specified position of the light receiving element 3.

Next, the operation of the optical pickup having the foregoing constitution will be described in brief. An emitted light from the light source 2 is made incident on the optical member 20, reflected by the light guiding element 22 and then made incident on the plural optical path forming element 21. The light made incident on the plural optical path forming element 21 and reflected (0-order light) is converged on the recording surface of the high density optical disk 52 by the converging optical system. The light made incident on the plural optical path forming element 21, diffracted and reflected (+1st-order light) is converged on the recording surface of the conventional low density optical disk 51 by the converging optical system. The light reflected by the optical disk and returned is reflected by the plural optical path forming element 21, made incident on the light guiding element 22, its optical path is separated from an emitted luminous flux herein, and then the light is guided to the light receiving element 3.

Because of the foregoing constitution, it is possible to further miniaturize the optical element 20. Thus, the entire optical pickup can be miniaturized and space can be efficiently utilized. Also, since the plural optical path forming element 21 and the light guiding element 22, both of which are composed of hologram elements, can be protected by the optical members 20b and 20c and deterioration of performance due to damaging of the hologram elements during assembling is prevented, it is possible to improve the reliability of the optical pickup.

(Embodiment 4)

The configuration of an optical pickup of the fourth embodiment of the present invention will now be described with reference to the accompanying drawings.

Figure 9:
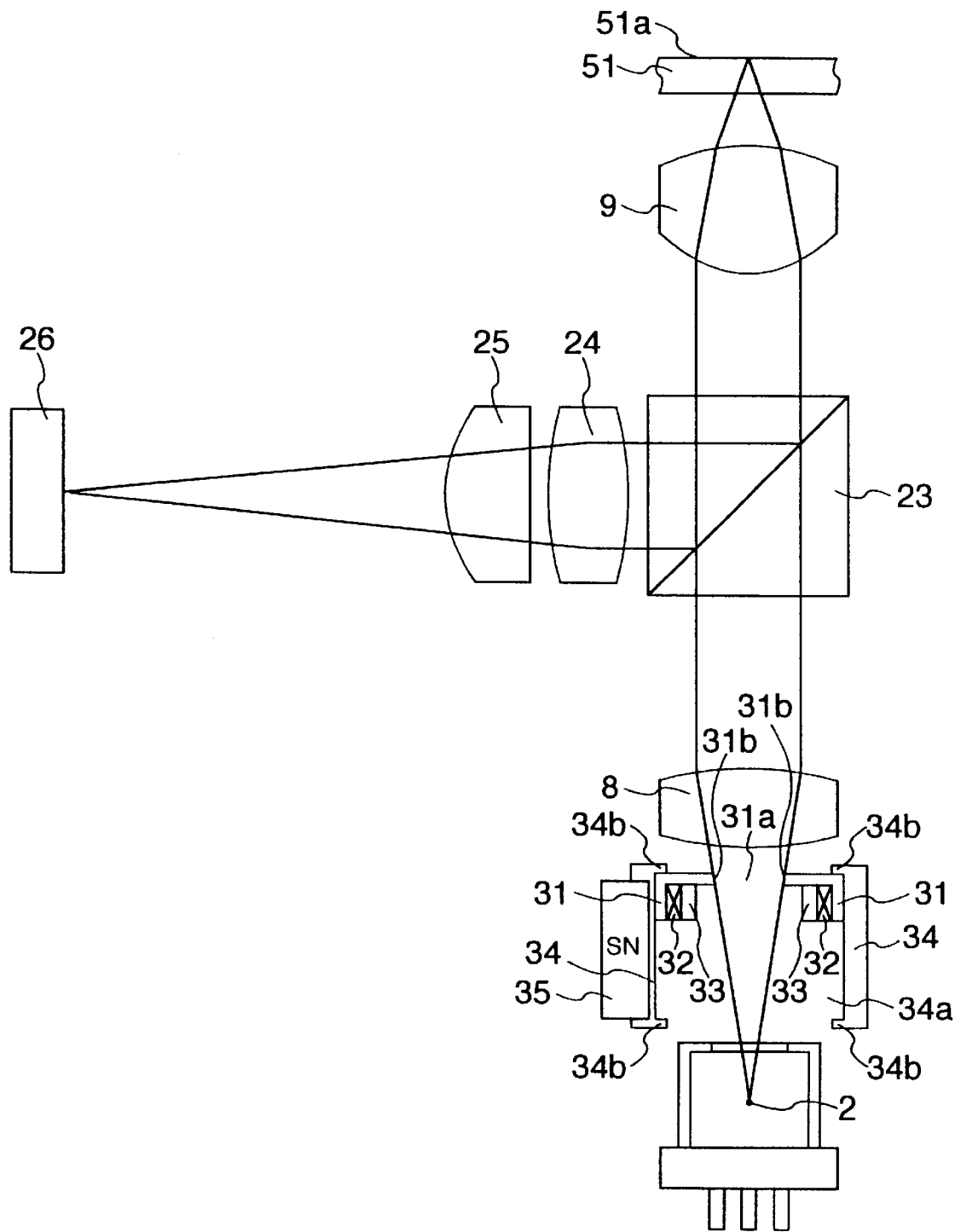
FIG. 9 is a view, showing a constitution of an optical pickup and an outgoing path according to a fourth embodiment of the present invention.
Figure 10:
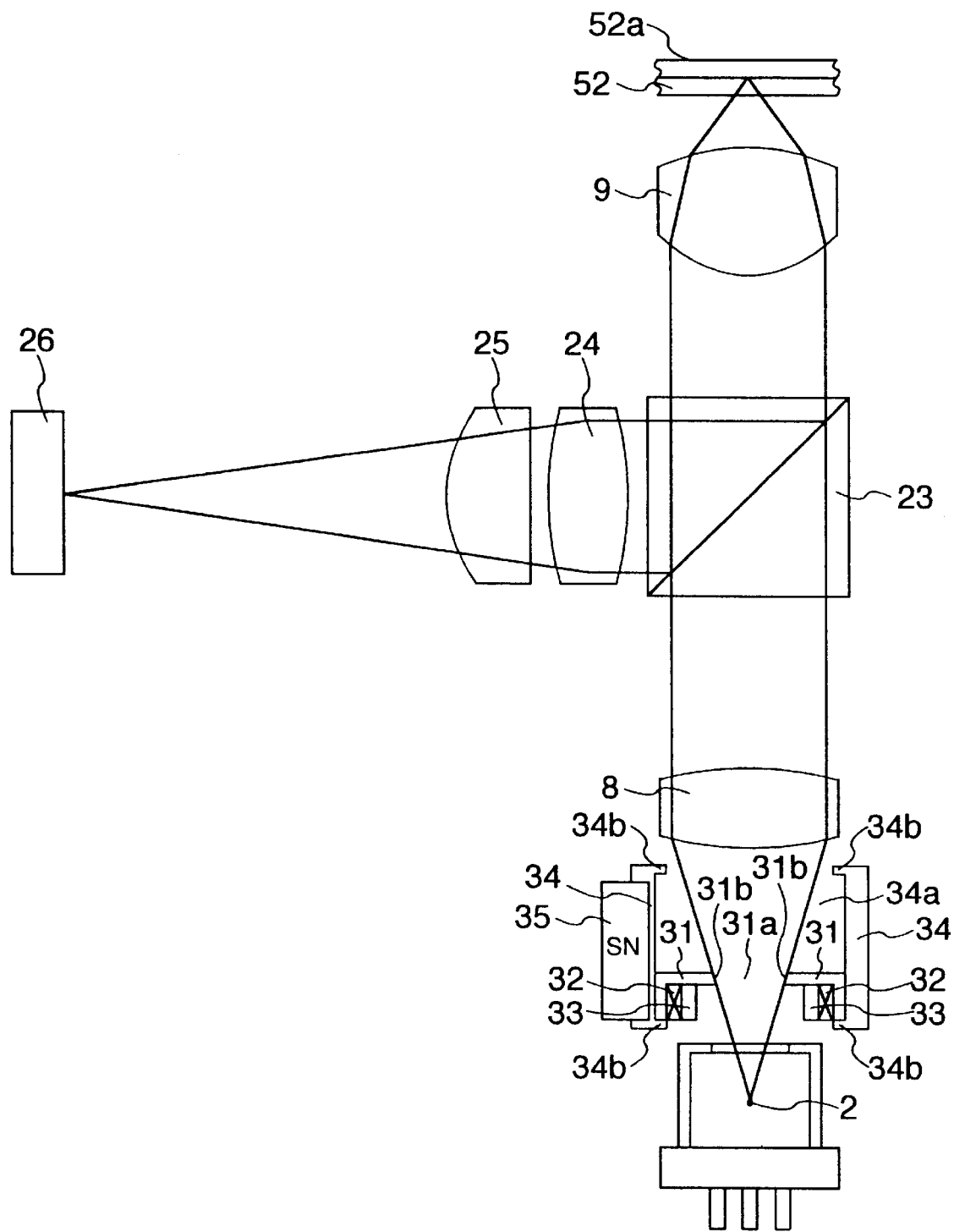
FIG. 10 is a view, showing a constitution of the optical pickup and an outgoing path according to the fourth embodiment of the invention.

FIGS. 9 and 10 are views, each showing the configuration of the optical pickup and an optical path from a light emitting point to the recording surface of a disk, that is, an outgoing path in the fourth embodiment of the invention. The optical pickups shown in FIGS. 9 and 10 are composed of almost the same members. However, FIG. 9 shows an optical path when reproducing is performed from the conventional low density optical disk, and FIG. 10 shows an optical path when reproducing is performed from the high density optical disk.

In FIGS. 9 and 10, the light source 2, the collimator lens 8 and the condenser lens 9 are almost similar to those shown in the embodiments 1, 2 and 3.

A numeral 23 denotes light dividing means, which functions for reflecting or transmitting an incident light. For the light dividing means 23, a half mirror having a fixed light transmission factor, a beam splitter film having a reflection factor, which is changed according to a light polarizing component, or the like is often used. In the fourth embodiment, a light emitted from the light source 2 and sent toward a recording medium is transmitted at a fixed rate, and a light reflected by the recording medium and returned is reflected at a fixed rate.

A numeral 24 denotes a convex lens, a numeral 25 denotes a semi-columnar lens, and the convex lens 24 and the semi-columnar lens 25 converge lights reflected by the light dividing means 23 and returned in a light receiving element 26 and cause the reflected lights to produce astigmatism.

The light receiving element 26 has a plurality of light receiving sensors in its light receiving surface, and this element is for converting optical signals made incident on these light receiving sensors into electric signals and outputting these. An RF signal, a tracking signal and a focusing signal are formed from the outputs of these light receiving sensors via an arithmetic and logic unit, and based on these signals, information reproducing, control for lens driving means and so on are performed.

A numeral 30 denotes an aperture control part, which is provided in an optical path for a light emitted from the light source 2. This part can change the position of a beam spot formed on the recording surface of the optical disk in a focusing direction by controlling an area in which a light can be passed (light solid angle).

Figure 11:
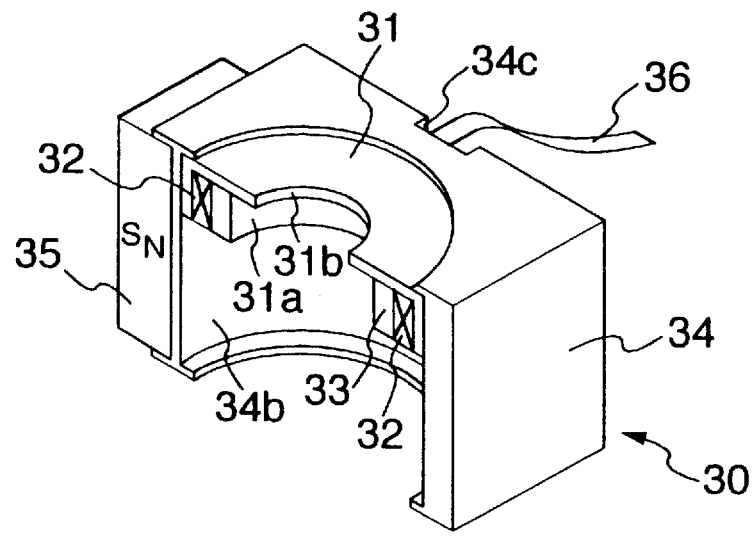
FIG. 11 is a sectional perspective view of a structure of an aperture control part according to the fourth embodiment of the invention.
Figure 12:
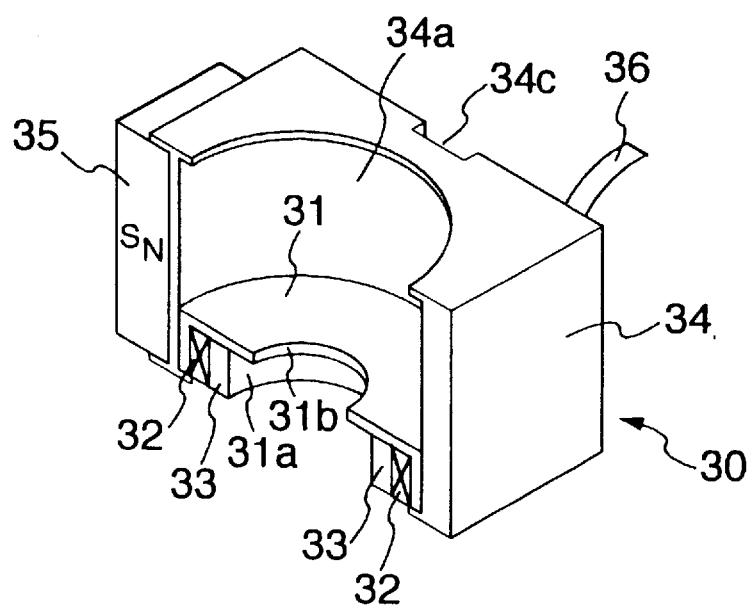
FIG. 12 is a sectional, perspective view of a structure of the aperture control part according to the fourth embodiment of the invention.

Next, the structure of the aperture control part 30 will be described with reference to the accompanying drawings. FIGS. 11 and 12 are section views, each showing in perspective the structure of the aperture control part of the fourth embodiment of the present invention.

A numeral 31 denotes an aperture member, which has a circular or a semicircular opening part 31a around the optical axis of a passing light. This member is held in the inner peripheral surface of a housing member 34 so as to be slid in the direction of the optical axis. For a material which constitutes the aperture member 31, it is preferred to use a resin, because this enables the member to be integrally formed with a coil. Also, it is preferred to form the outer periphery of a part, which comes into contact with the housing member 34, to be roughly circular, because this makes it possible to limit to a minimum a friction force, which is produced when the member 31 is slid on the inner peripheral surface of the housing member 34 in the direction of the optical axis and thereby perform a fast and smooth operation.

Furthermore, a tapered part should preferably be formed in an end surface part 31b along the opening part 31a of the aperture member 31 and its thickness in the direction of the optical axis should be formed thinner than the other parts. This constitution makes it possible to reduce the quantity of a light reflected or diffracted by the end surface part 31b of the aperture member 31 and prevent an optical characteristic of the light sent toward the optical disk from being deteriorated due to such a phenomenon. Therefore, a high performance optical pickup having a good optical characteristic can be provided. Especially, the optical pickup of the present invention has a possibility of being used for a portable device and so on. In this case, it is highly likely that external disturbances such as vibrations due to a movement during the operation will occur. Thus, considering such a condition in which the device is used, it is very important to eliminate causes of signal deterioration as many as possible beforehand. For this reason, it is particularly preferred to form the end surface of the aperture member 31, which can become a big cause of reflection or diffraction, so as to limit the occurrence of reflection or diffraction as much as possible. Instead of the tapered part, the end surface may be formed round.

The aperture member 31 also has a yoke 33, which is composed of a coil 32 wound around the optical axis of a passing light in a ring shape so as to have a diameter larger than that of the opening part 31a and a magnetic material. In the fourth embodiment, the coil 32 is arranged toward the optical axis, and the yoke 33 is formed in the outer peripheral side of the coil 32.

As described above, the inner diameter of the coil 33 arranged toward the optical axis is formed larger than that of the opening part 31a. This makes it possible to prevent a loss from occurring in a light to be originally projected to the optical disk during passing through the aperture control part 30 and a light made incident on the end surface part in the optical axis side of the coil 32 from being reflected and again entering the optical path. Consequently, since light utilization efficiency can be improved, which enables the light source 2 having a smaller output to be used, it is possible to reduce power consumption of the optical pickup, reduce the quantity of a light reflected or diffracted by the end surface part of the coil 32 and prevent an optical characteristic of a light sent toward the optical disk from being deteriorated due to such a phenomenon. Therefore, a high performance optical pickup having a good optical characteristic can be provided.

Next, the structure of the housing member 34 will be described. The housing member 34 is for housing the aperture member 31, which has the coil 32 and the yoke 33. In the fourth embodiment, this is formed to be a rectangular parallelepiped or a column having in the inside a through-hole part 34a in which the aperture member 31 is fitted. The through-hole part 34a is formed so as to fit the outer peripheral shape of the aperture member 31. It is especially preferred to form the inner diameter of the through-hole part 34a smaller than the outer peripheral shape of the aperture member 31 so as to obtain good sliding performance. Moreover, since it is necessary to obtain good sliding performance with the aperture member 31, the inner peripheral surface of the through-hole part 34a should preferably formed very smoothly.

A projecting portion 34b is formed in the end portion of the through-hole part 34a of the housing member 34. This projecting part 34b is for accurately defining the standstill position of the aperture member 31, which is slid in the through-hole 34a in the direction of the optical axis.

A notched part 34c is provided in one side face, which is in parallel with the optical axis direction of the housing member 34. Via this notched part 34c, the coil 32 is connected to power supply means 36 for supplying power from a power source. Because of the notched part 34c provided in the housing member 34, it is easy to set wiring for the power supply means 36. For the power supply means 36, a leading wire or a flexible printed board (referred to FPC, hereinafter) is often used. Especially, by using FPC, a good follow-up ability can be obtained with respect to the sliding of the aperture member 31 in the optical axis direction. Thus, disconnection and so on can be reduced for the power supply means 36 and thereby the reliability can be improved.

Furthermore, a magnet 35 is provided in the external side face of the housing member 34, which is in parallel with the optical axis direction. The magnet 35 is arranged in such a manner that magnetic poles can exist in an end surface opposite the external side face of the housing member 34 and an end surface in a side opposite the end surface. This magnet 35 may be a permanent magnet or an electromagnet.

Next, the operation of the aperture control part 30 having the foregoing structure will be described.

In the fourth embodiment, as a method for operating the aperture control part 30, a force which is produced by supplying a current to the coil 32 orthogonal to a stationary magnetic field is used. A magnetic flux produced from the magnet 35 is sent toward the yoke 33 after penetrating the coil 32. If a current is supplied to the coil 32 in this condition, a propelling force is produced in the optical axis direction in the coil 32 according to Fleming's left hand rule. Since the coil 32 is provided in the aperture member 31, the aperture member 31 is slid by means of this propelling force in the optical axial direction in the through-hole part 34a of the housing member 34 and stopped still in a specified position. The sliding direction of the aperture member 31 can be changed according to the direction of a current, which is supplied to the coil 32. Specifically, if the magnetic poles of the magnet 35 are arranged like those shown in the drawing, when the direction of a current supplied to the coil 32 is from the front surface to the back surface in the drawing, an upward propelling force is produced in the aperture member 31, and the member 31 can be moved to the upper end part of the housing member 34 as shown in FIGS. 9 and 11. Conversely, when the direction of a current supplied to the coil 32 is from the back surface to the front surface, a downward propelling force is produced in the aperture member 31, and as shown in FIGS. 10 and 12, the member 31 can be moved to the lower end part of the housing member.

After the aperture member 31 has moved to a specified position, a current supplied to the coil 32 for bringing the aperture member 31 to a standstill needs only to produce a force, which is enough to prevent the member 312 from being moved due to external disturbances and so on. Thus, the amount of this current is very small compared with that when the aperture member 31 is to be moved. This can prevent power consumption by the entire device from being greatly increased.

Such an operation of the aperture control part 30 makes it possible to set the numerical aperture of the condenser lens 9 to a specified size and control the spot sizes of lights converged in the optical disk. Consequently, it is possible to provide an optical pickup with a simple configuration, which is capable of performing reading from plural kinds of optical disks having different bits recorded in the optical disks. Moreover, it is possible to provide a good responding speed by using an electromagnetic force as a moving method.

The operation of the optical pickup having the foregoing configuration when reproducing is performed from the high density optical disk 52 will be described by referring to FIG. 10.

First, the high density optical disk 52 having a thickness of about 0.6 mm is mounted on the spindle motor. A current flowing from the front surface of the paper to the back surface is supplied to the coil 32, the aperture member 31 of the aperture control part 30 is moved to the lower end surface side (light source 2 side) of the housing member 34 and stopped. Lights in the peripheral part among those emitted from the light source 2 are shielded by the aperture member 31, and thus the lights which have passed through the opening parts 31a are made incident on the collimator lens 8. The lights having limited diffusion angles at the time of being emitted from the light source 2 are converted into parallel lights having almost no diffusion angles, most of these are passed through the light dividing means 23 and made incident on the condenser lens 9. By optimizing the condenser lens 9, the standstill position of the aperture member of the aperture control part 30, the diameter of the opening part 31a and so on, the lights having been passed through the condenser lens 9 are converged by a numerical aperture of about 0.6, and spots small enough to reproduce data recorded on the recording surface 52a of the high density optical disk 52 are formed. A light having information about a reproducing signal reflected by the recording surface 52a is converted into a parallel light again via the condenser lens 9, then deflected by 90° by the light dividing means and its optical path is caused to be different from that for the outgoing light. A light divided and guided to the reflection optical path is made incident on the convex lens 24 and the semi-columnar lens 25, converted from a parallel light into a light having a diffusion angle in a converging direction, and made incident on the light receiving element 26 while producing astigmatism.

Next, the operation when reproducing is performed from the conventional low density optical disk 51 will be described by referring to FIG. 9.

First, the conventional low density optical disk 52 having a thickness of about 1.2 mm is mounted on the spindle motor. A current flowing from the back surface of the paper to the front surface is supplied to the coil 32, and the aperture member 31 of the aperture control part 30 is moved to the upper end surface side (collimator lens 20 side) of the housing member 34 and brought to a standstill. Lights in the peripheral part among those emitted from the light source 2 are shielded by the aperture member 31, and thus only the light having been passed through the opening part 31a are made incident on the collimator lens 8. Lights having limited diffusion angles at the time of being emitted from the light source 2 are converted into parallel lights having almost no diffusion angles by the collimator lens 8, most of these are passed through the light dividing means 23 and made incident on the condenser lens 9. By optimizing this condenser lens 9, the standstill position of the aperture member of the aperture control part 30, the diameter of the opening part 31a and so on, the light having been passed through the condenser lens 9 are converged by a numerical aperture of about 0.4, and spots small enough to reproduce data recorded on the recording surface 51a of the low density optical disk 51 are formed.

Now, a reason for setting the numerical aperture for the condenser lens 9 to about 0.4 will be described. In the case of the light source 2 used in the embodiment, a wave length of a light emitted from the source is set to one within a range of 635 to 650 nm. Based on this range of a wavelength, the condenser lens 9 is designed to have a numerical aperture of about 0.6 and form a very small spot on the recording surface 52a of the high density optical disk 52. However, in this condition, if lights are converged on the recording surface 51a of the conventional low density optical disk 51 which has a different disk substrate thickness, a large spherical aberration occurs due to a difference in disk substrate thickness. Thus, in the past, it was impossible to read data from the conventional disk 51 because of large blurring of the image forming spot. In order to reproduce data from the conventional low density optical disk 51, it is only necessary form a spot, which has a size 1.6 times as large as a spot required for the high density optical disk 52. In the conventional optical pickup, the light source of about 780 nm and the condenser lens having a numerical aperture of about 0.45 were used. Considering the characteristics of these, in the optical system of the embodiment, if the numerical aperture of the condenser lens 9 is set to 0.35 to 0.4, a large aberration is caused to exist due to the difference in disk substrate thickness. Also, since the wavelength of the used light source is 635 to 650 nm, shorter than conventionally (780 nm), it is possible to form, on the recording surface 51a of the conventional low density optical disk 51, a very small spot sufficient to reproduce recorded data even when spot blurring occurs, that is, the size of a spot for reading bits recorded in the conventional low density optical disk 51.

A light having information about a reproducing signal reflected by the recording surface 51a is converted into a parallel light again via the condenser lens 9, then deflected by 90° by the light dividing means 23 and its optical path is caused to be different from that for the outgoing light. The light divided and guided to the reflection optical path is made incident on the convex lens 24 and the semi-columnar lens 25, converted from a parallel light into a light having a diffusion angle in a converging direction and made incident on the light receiving element 26 while producing astigmatism.

By using the foregoing configuration, it is possible to read data from the plurality of optical disks, which are different from one another in disk substrate thickness, by the same optical pickup without reducing light utilization efficiency. As a result, since the output of the light source 2 can be reduced, power consumption and costs can be reduced. Also, since the weight of the aperture member 31 is reduced, it is possible to increase a responding speed when the member 31 is moved to a position according to the kind of the optical disk.

Next, a light made incident on the light receiving element 26 will be described. The light made incident on the light receiving element 26 forms a reproducing signal, which corresponds to date recorded on the recording surface of the optical disk. In the optical disk device, a very small spot is always formed on the data track of the optical disk recording surface during recording/reproducing. However, in order to cause this spot to trace the data track and accurately form a very small spot on the data track, it is necessary to perform focusing control for moving the condenser lens 9 in the direction of the optical axis and tracking control for moving the same approximately in a lateral direction against the optical disk. Thus, the light made incident on the light receiving element 26 is also used for focusing control and tracking control.

Figure 13:
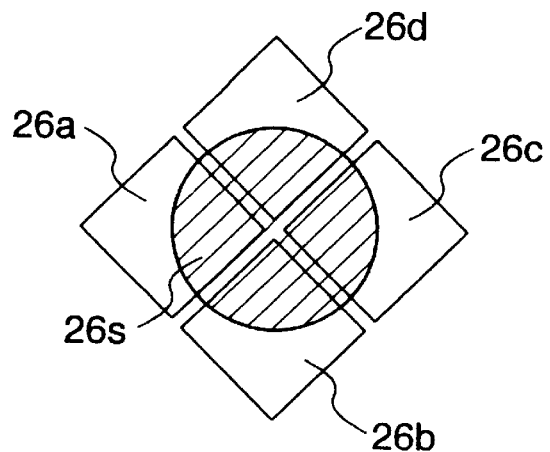
FIGS. 13 to 15 are views, showing a shape of a light in a light receiving element according to the fourth embodiment of the invention.
Figure 14:
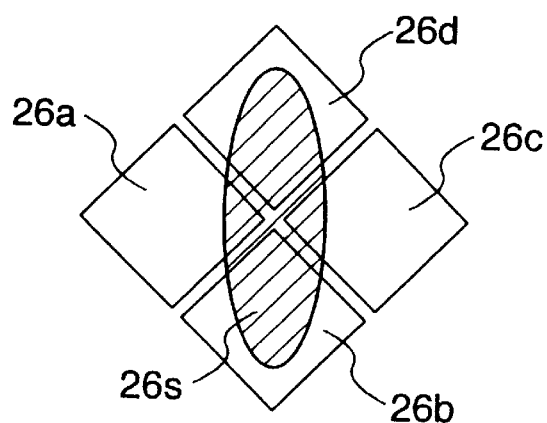
Figure 15:
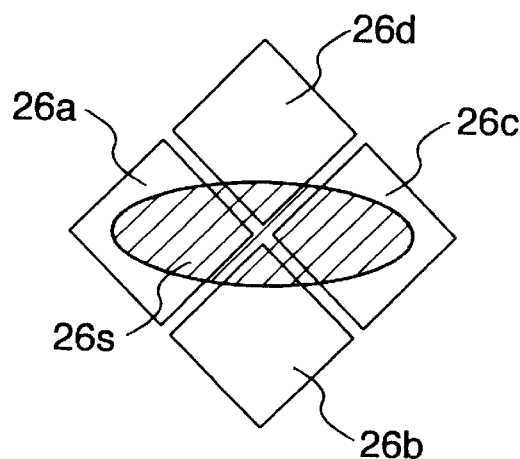
Figure 17A:
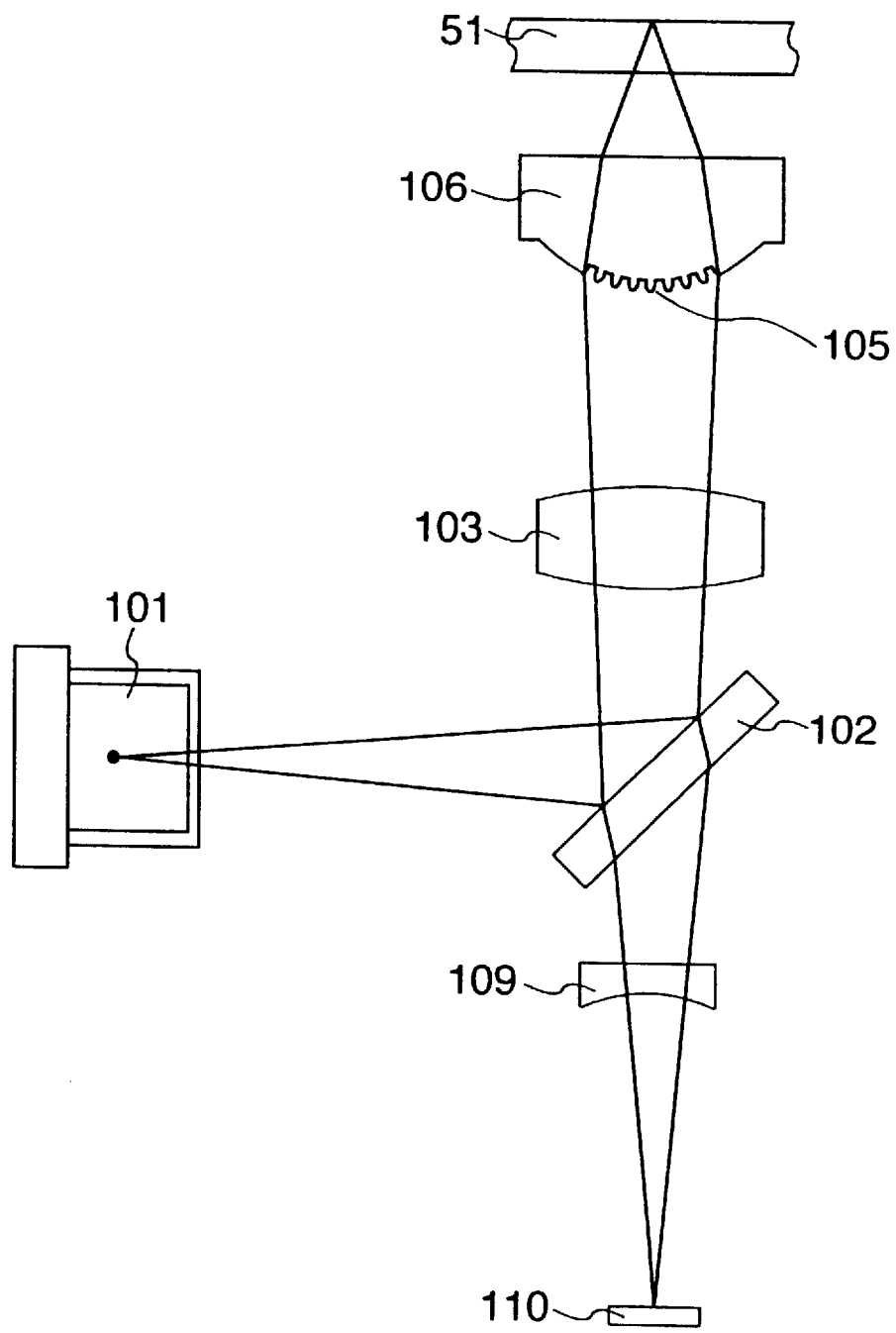
FIGS. 17A and 17B are views, each showing a constitution of another conventional optical pickup and an optical path.
Figure 17B:
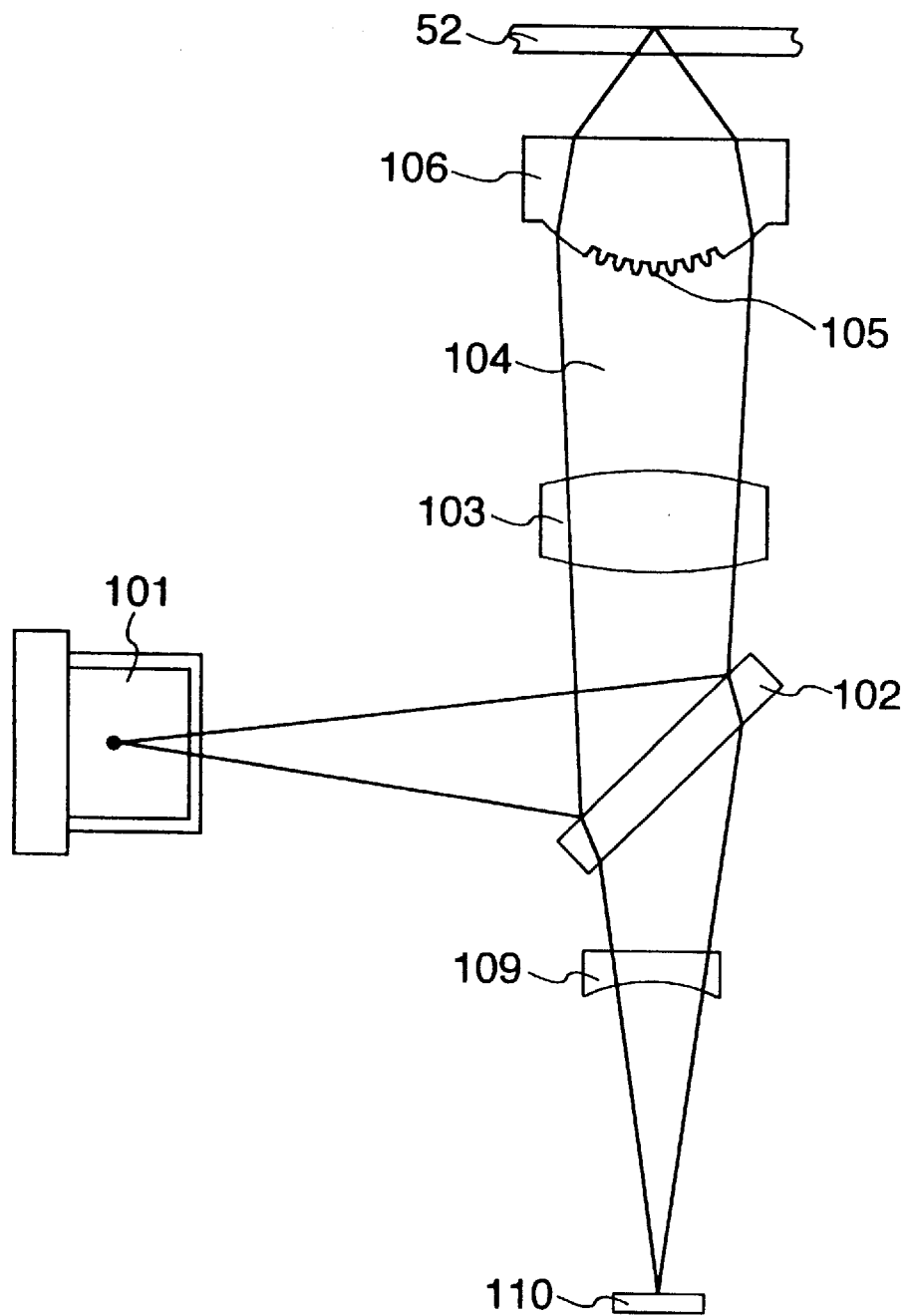

First, a method of detecting a focus error signal for performing focusing control will be described by referring to FIGS. 13 to 15. In the embodiment, a focus error signal is formed by a method typically known as an astigmatic method. FIGS. 13 to 15 are views, each showing a shape of a light in the light receiving element of the embodiment of the present invention. Specifically, FIG. 13 shows an in-focus condition while FIGS. 14 and 15 each shows an out-of-focus condition. A focus error signal is formed by a difference, which is obtained by subtracting the sum of received light quantities between the split sensors 26b and 26d from the sum of received light quantities between the split sensors 26a and 26c (this subtraction may be carried out reversibly), among the four split sensors 26a, 26b, 26c and 26d shown in the drawing. The shape of the light made incident on the light receiving element 26, that is, a light receiving spot 26s is almost circular, as shown in FIG. 15, when a focus is realized on the recording surface of the optical disk, and a difference between the sum of the split sensors 26a and 26c and the sum of the split sensors 26b and 26d is zero. However, when no focusing is realized on the recording surface of the optical disk, as shown in FIG. 14 or FIG. 15, the shape of the light receiving spot 26s is vertically or horizontally long elliptic, a difference between the sum of the split sensors 26a and 26c and the sum of the split sensors 26b and 26d is not zero, and thus a focus error signal having a size according to a focus shifting amount can be obtained.

As described above, by detecting a difference between the sum of the split sensors 26a and 26c and the sum of the split sensors 26b and 26d, it is possible to obtain a focus error signal according to a focus shifting amount. Furthermore, by controlling the actuator for holding the condenser lens 9 to be driven in a focusing direction so as to make this focus error signal zero, it is possible to always form a very small spot on the recording surface of the optical disk.

Next, a method of detecting a tracking error signal for performing tracking control will be described. In the embodiment, a tracking error signal is formed by using a method typically known as a push-pull method. More particularly, by detecting a difference between the received light quantity of the split sensor 26a and the received light quantity of the split sensor 26c, a tracking error signal having a size according to a shifting amount from a specified track can be obtained. By controlling the actuator for holding the condenser lens 9 to be driven in a tracking direction so as to make this tracking error signal zero, a very small spot can always be formed in a specified track on the recording surface of the optical disk.

In the embodiment, the collimator lens 8 is arranged between the light source 2 and the condenser lens 9. But without using the collimator lens 8, it is possible to guide the condenser lens 9 while keeping a light from the light source 2 in an emitted condition. In this case, it is only necessary to arrange the aperture control part 30 in the optical path between the light source 2 and the condenser lens 9.

Also, in the embodiment, the aperture member 31 is driven by using the coil 32 and the magnet 35. But a method other than this may be utilized. For example, a method of pressing the aperture member 31 in one direction by an elastic member and moving this in a reverse direction by an electromagnetic solenoid, a shape memory alloy and so on may be considered.

Furthermore, in the embodiment, the present invention was explained by using the optical pickup exclusively used for reproduction. However, the present invention can be applied to an optical disk, such as a magneto-optical disk, a phase transition type optical disk and the like, for which recording can also be performed. In particular, when recording is performed for an optical disk, for which both recording and reproducing can be carried out, a light quantity on the recording surface must be increased more than the quantity when reproducing is performed for an optical disk exclusively used for reproduction. Thus, in this case, by using the embodiment of the present invention, which produces only a small loss in a light in the optical path, it is possible to improve light utilization efficiency and thereby easily provide a necessary light quantity on the recording surface during recording. As a result, the output of the light source 2 can be made smaller and low power consumption can be realized.

What is claimed is:

1. An optical pickup comprising:
   a light source for emitting a first light;
   light converging means for converging the first light emitted from said light source on a recording surface of an optical disk;
   signal detecting means for detecting a second light reflected by said recording surface and converting the second light into an electric signal;
   a first optical element, arranged between said light source and said light converging means, for forming a plurality of diffracted lights from the first light emitted from said light source; and
   a second optical element arranged between said light source and said light converging means for making an optical path for the second light reflected by said recording surface of said optical disk and an optical path for the first light different from each other,
   wherein a first focal length for converging of a first diffracted light among said plurality of diffracted lights and a second focal length for converging of a second diffracted light among said plurality of diffracted lights are different from each other such that a difference between the first and second focal lengths is 1.0 mm or lower.

2. The optical pickup as claimed in claim 1, wherein said second optical element is arranged closer to said light source than said first optical element is.

3. The optical pickup as claimed in claim 1, wherein said first and second optical elements are formed of common members.

4. The optical pickup as claimed in claim 1, further comprising collimator means arranged between said light converging means and said first optical element for converting an emitted light into an approximately parallel light.

5. The optical pickup as claimed in claim 1, wherein among said plurality of diffracted lights, at least a first diffracted light is 0-order diffracted light and alternatively a second diffracted light is ±1st-order diffracted light.

6. The optical pickup as claimed in claim 1, wherein the difference is 0.6 mm or lower.

7. An optical pickup comprising:
   a light source for emitting a first light;
   light converging means for converging the first light emitted from said light source on a recording surface of an optical disk;
   signal detecting means for detecting second light reflected from said recording surface; and
   a first optical member provided between said light source and said light converging means and having a hologram element, said hologram element for converting a first part of the first light emitted from a first light emitting point of said light source such that the first part emanates from a second light emitting point which is nearer to said light converging means than said first light emitting point is, wherein a second part of the first light emitted from said first light emitting point is converged in a first optical path, the first part is converged in a second optical path, and a second focal length of said light converging means in said second optical path is set longer than a first focal length of said light converging means in said first optical path.

8. The optical pickup as claimed in claim 7, wherein the first focal length is used for performing at least one of recording and reproducing from an optical disk having a substrate thickness of about 0.6 mm, and the second focal length is used for performing at least one of recording and reproducing from an optical disk having a substrate thickness of about 1.2 mm.

9. The optical pickup as claimed in claim 8, wherein a light receiving element is arranged inside a package containing said light source, and said first optical member and a second optical member are joined to each other and fixed to a surface of an emitting side of said package.

10. An optical pickup comprising:

a light source for emitting light;

light converging means for converging the light; and an aperture member for limiting a light transmission region for the light emitted from said light source by moving in an optical axis direction so as to control spreading of said light, (ii) a focus forming position of said light converging means and (iii) a diameter of a spot of said light on an optical disk.

11. An optical pickup comprising:

a light source for emitting a first light;

light converging means for converging the first light emitted from said light source on a recording surface of an optical disk;

signal detecting means for detecting a second light reflected by said recording surface and converting the second light into an electric signal;

an aperture member arranged in an optical path between said light source and said light converging means; and aperture control means for controlling a position of said aperture member in a path of the first light, wherein said aperture member limits a transmission region for the first light emitted from said light source.

12. The optical pickup as claimed in claim 11, wherein a tapered part is provided in a peripheral end part of an optical axis side of said aperture member.

13. The optical pickup as claimed in claim 11, wherein said aperture member is moved by an electromagnetic force.

14. An optical pickup comprising:

a light source for emitting a first light;

light converging means for converging the first light emitted from said light source on a recording surface of an optical disk;

signal detecting means for detecting a second light reflected by said recording surface and converting the second light into an electric signal;

an aperture member arranged in an optical path between said light source and said light converging means; and aperture control means for controlling a position of said aperture member in a path of the first light, wherein said aperture member is moved in an optical axis direction by said aperture control means and a transmission region for the first light emitted from said light source is controlled.

15. The optical pickup as claimed in claim 14, wherein said aperture member is moved by an electromagnetic force.

16. The optical pickup as claimed in claim 14, wherein a tapered part is provided in a peripheral end part of an optical axis side of said aperture member.

* * * * *